US011018538B2

(12) United States Patent
Sawada

(10) Patent No.: US 11,018,538 B2
(45) Date of Patent: May 25, 2021

(54) ROTOR ASSEMBLY, MOTOR, BLOWER, AND VACUUM CLEANER

(71) Applicant: Nidec Corporation, Kyoto (JP)

(72) Inventor: Tomoyoshi Sawada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 119 days.

(21) Appl. No.: 16/356,055

(22) Filed: Mar. 18, 2019

(65) Prior Publication Data
US 2019/0305620 A1    Oct. 3, 2019

(30) Foreign Application Priority Data

Mar. 29, 2018    (JP) .............................. JP2018-064048

(51) Int. Cl.
| | |
|---|---|
| *H02K 1/30* | (2006.01) |
| *H02K 1/27* | (2006.01) |
| *H02K 15/03* | (2006.01) |
| *H02K 11/33* | (2016.01) |
| *A47L 5/22* | (2006.01) |
| *F04D 25/06* | (2006.01) |

(Continued)

(52) U.S. Cl.
CPC .................. *H02K 1/30* (2013.01); *A47L 5/22* (2013.01); *F04D 25/0606* (2013.01); *F04D 29/023* (2013.01); *H02K 1/2726* (2013.01); *H02K 1/2733* (2013.01); *H02K 1/28* (2013.01); *H02K 7/083* (2013.01); *H02K 7/14* (2013.01); *H02K 11/33* (2016.01); *H02K 21/16* (2013.01); *F05D 2230/23* (2013.01); *H02K 15/03* (2013.01); *H02K 2211/03* (2013.01)

(58) Field of Classification Search
CPC ...... H02K 1/27; H02K 1/2706; H02K 1/2726; H02K 1/2733; H02K 1/28; H02K 1/30; H02K 7/083; H02K 11/33; H02K 21/16; H02K 7/14; H02K 2211/03; F04D 25/0606; A47L 5/22
USPC ...................................................... 310/156.21
See application file for complete search history.

(56) References Cited

U.S. PATENT DOCUMENTS

| | | | |
|---|---|---|---|
| 3,246,187 | A | 4/1966 | Iemura |
| 8,756,794 | B2 | 6/2014 | Ions et al. |

(Continued)

FOREIGN PATENT DOCUMENTS

| | | |
|---|---|---|
| DE | 10 2007 062 010 A1 | 4/2009 |
| EP | 2 961 041 A2 | 12/2015 |

(Continued)

OTHER PUBLICATIONS

Shiozawa et al., "Rotor Assembly, Motor, Blower, and Vacuum Cleaner", U.S. Appl. No. 16/278,873, filed Feb. 19, 2019.

(Continued)

*Primary Examiner* — Burton S Mullins
(74) *Attorney, Agent, or Firm* — Keating & Bennett

(57) ABSTRACT

A rotor assembly includes a shaft disposed along a central axis extending vertically, a tubular magnet disposed on a radially outer surface of the shaft, a lower spacer disposed axially below the magnet and fixed to the radially outer surface of the shaft, a shaft adhesive film attaching the shaft to the magnet, and a lower spacer adhesive film attaching an axially upper surface of the lower spacer to an axially lower surface of the magnet. The shaft adhesive film and the lower spacer adhesive film are an identical adhesive and are continuously formed.

15 Claims, 16 Drawing Sheets

(51) Int. Cl.
  *H02K 7/08* (2006.01)
  *H02K 7/14* (2006.01)
  *H02K 21/16* (2006.01)
  *H02K 1/28* (2006.01)
  *F04D 29/02* (2006.01)

(56) References Cited

U.S. PATENT DOCUMENTS

| | | | |
|---|---|---|---|
| 9,048,715 B2* | 6/2015 | Kodani | H02K 15/03 |
| 9,472,984 B2 | 10/2016 | Taniguchi | |
| 9,667,109 B2 | 5/2017 | Tremelling | |
| 9,755,466 B2 | 9/2017 | Ions et al. | |
| 2010/0209872 A1 | 8/2010 | Kuhn et al. | |
| 2012/0049662 A1 | 3/2012 | Ions | |
| 2014/0184007 A1 | 7/2014 | Ions et al. | |
| 2017/0194833 A1* | 7/2017 | Bang | H02K 15/03 |
| 2017/0353069 A1 | 12/2017 | Ions et al. | |
| 2018/0076683 A1* | 3/2018 | Hwang | H02K 9/06 |
| 2018/0156233 A1* | 6/2018 | Sawada | F04D 29/44 |
| 2018/0159402 A1* | 6/2018 | Lee | H02K 1/28 |
| 2018/0172024 A1* | 6/2018 | Hayamitsu | F04D 29/44 |

FOREIGN PATENT DOCUMENTS

| | | |
|---|---|---|
| EP | 3 154 167 A1 | 4/2017 |
| JP | 2002-233088 A | 8/2002 |
| JP | 2004-364474 A | 12/2004 |
| JP | 2007-228762 A | 9/2007 |
| JP | 2010-057233 A | 3/2010 |
| JP | 2011-041371 A | 2/2011 |
| JP | 6168263 B1 | 7/2017 |
| JP | 2017-192169 A | 10/2017 |
| JP | 6319416 B1 | 5/2018 |

OTHER PUBLICATIONS

Takaki, "Rotor Assembly, Motor, Blower, and Vacuum Cleaner", U.S. Appl. No. 16/356,049, filed Mar. 18, 2019.
Niabeshi et al., "Rotor Assembly, Motor, Blower, and Vacuum Cleaner", U.S. Appl. No. 16/356,052, filed Mar. 18, 2019.

\* cited by examiner

ROTOR ASSEMBLY, MOTOR, BLOWER, AND VACUUM CLEANER

CROSS REFERENCE TO RELATED APPLICATIONS

This application claims the benefit of priority to Japanese Patent Application No. 2018-064048 filed on Mar. 29, 2018. The entire contents of this application are hereby incorporated herein by reference.

BACKGROUND OF THE INVENTION

1. Field of the Invention

The present disclosure relates to a rotor assembly, a motor with a rotor assembly, a blower with a motor, and a vacuum cleaner with a blower.

2. Description of the Related Art

A motor provided with a rotor section in which a ring-shaped magnet is fixed to an outer peripheral portion of a motor shaft is disclosed. The motor includes a stator yoke section fixed to the inside of a motor case and the rotor section rotatably disposed on an inner surface side of the stator yoke section. The rotor section includes a motor shaft and the ring-shaped (cylindrical or annular) magnet attached to the motor shaft. The ring-shaped magnet is covered with a cover film. Since the cover film is thermally shrunk and fixed, the required crushing strength in the circumferential direction of the ring-shaped magnet can be uniformly obtained.

However, the rotor section has the cover film fixed by heat shrinkage, and thus, has a complicated structure. Due to such a structure, it takes time and effort to manufacture and perform maintenance.

SUMMARY OF THE INVENTION

An example rotor assembly of the present disclosure includes a shaft disposed along a central axis extending vertically, a tubular magnet disposed on a radially outer surface of the shaft, a lower spacer disposed axially below the magnet and fixed to the radially outer surface of the shaft, a shaft adhesive film disposed between the radially outer surface of the shaft and a radially inner surface of the magnet to attach the shaft to the magnet, and a lower spacer adhesive film disposed between an axially upper surface of the lower spacer and an axially lower surface of the magnet to attach the lower spacer to the magnet. The shaft adhesive film and the lower spacer adhesive film are an identical adhesive and are continuously formed.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, example embodiments of the present disclosure will be described in detail with reference to the drawings. In the specification, in a blower A, a direction parallel to a central axis Ax of the blower A is referred to as an "axial direction", a direction perpendicular to the central axis Ax of the blower A is referred to as a "radial direction", and a direction along an arc about the central axis Ax of the blower A is referred to as a "circumferential direction". Similarly, regarding a rotor assembly 5, directions coinciding with the axial direction, the radial direction, and the circumferential direction of the blower A in the state of being incorporated in the blower A are simply referred to as an "axial direction", a "radial direction" and a "circumferential direction", respectively.

In addition, in the specification, a shape and a positional relationship of each part will be described with the axial direction as the up-down direction in the blower A and an intake port 311 side of an upper cover 31 with respect to an impeller 2 as the upper side in the blower A. The up-down direction is a term used simply for the description and does not limit the positional relationship and the direction of the blower A while in use. In addition, "upstream" and "downstream" respectively indicate an upstream side and a downstream side, respectively, in a flowing direction of air sucked from the intake port 311 when the impeller 2 is rotated.

Figure 10:
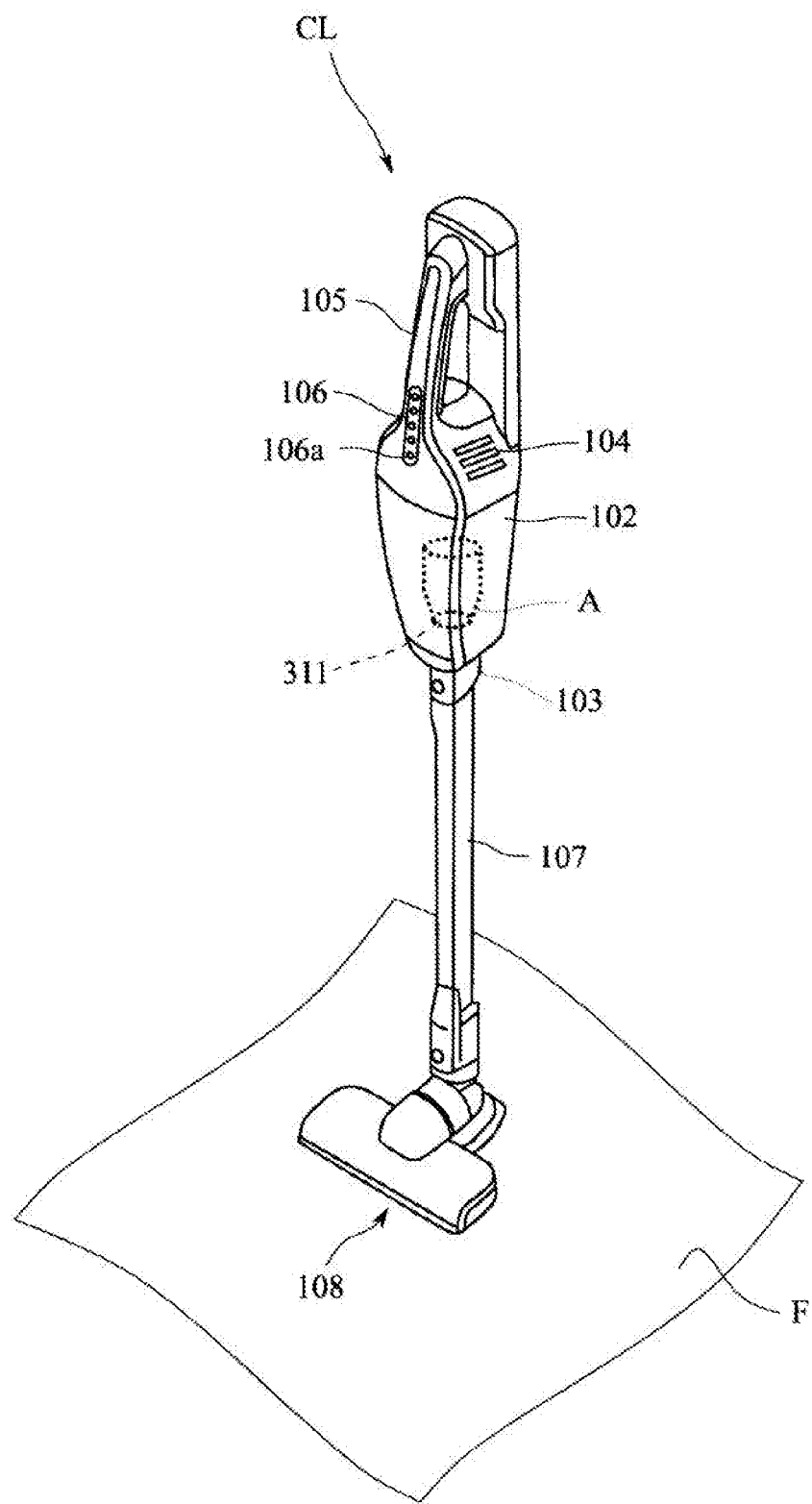
FIG. 10 is a perspective view of a vacuum cleaner according to an example embodiment of the present disclosure.

In the specification, a shape and a positional relationship of each part will be described with a direction approaching a floor surface F (surface to be cleaned) in FIG. 10 as a "lower side" and a direction away from the floor surface F as an "upper side" in a vacuum cleaner CL. It should be noted, however, that these directions are terms used simply for the description and does not limit the positional relationship and the direction of the vacuum cleaner CL while in use. In addition, "upstream" and "downstream" respectively indicate an upstream side and a downstream side, respectively, in a flowing direction of air sucked from an intake portion 103 when the blower A is driven.

Figure 1:
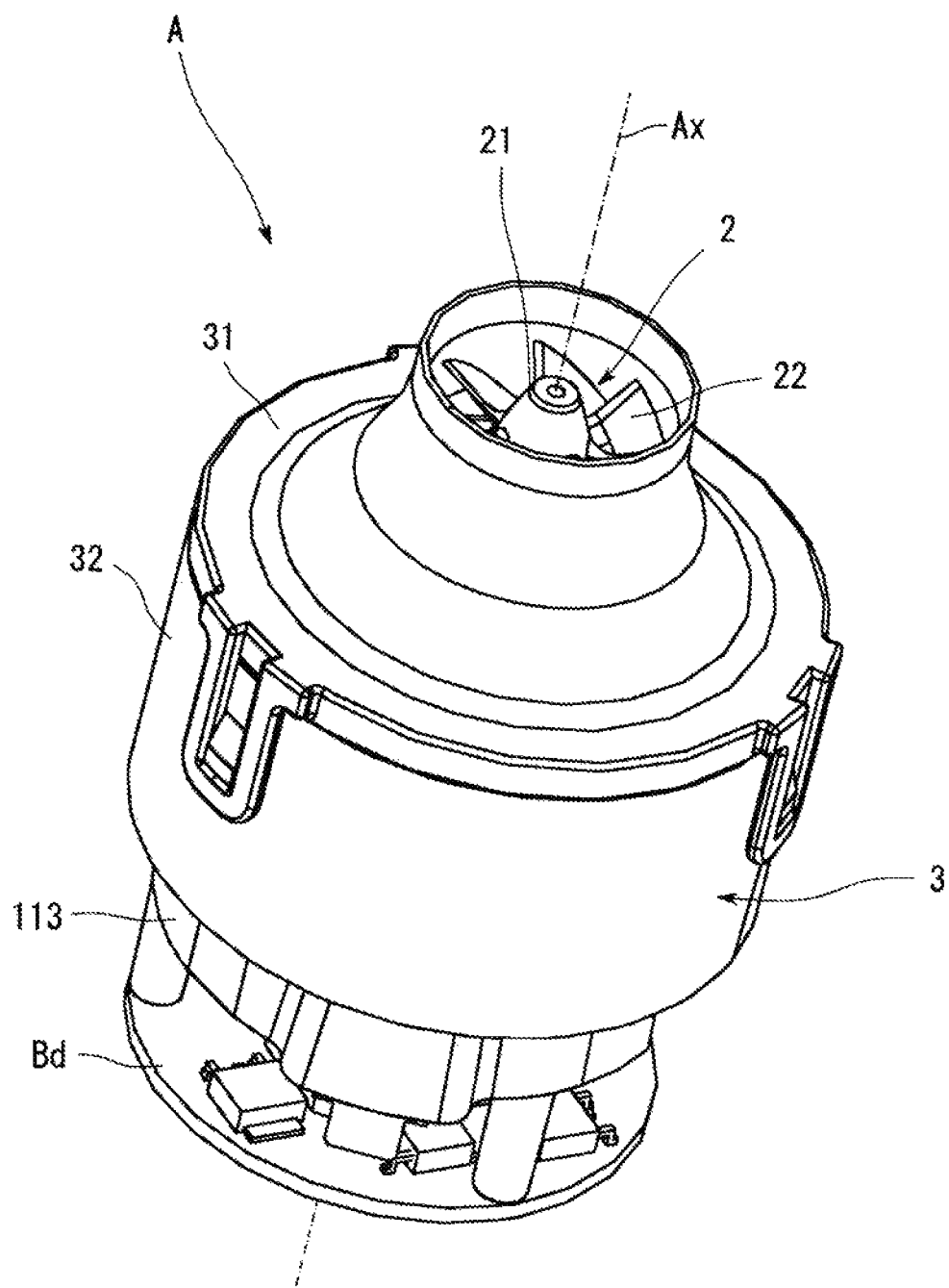
FIG. 1 is a perspective view of a blower according to an example embodiment of the present disclosure.
Figure 2:
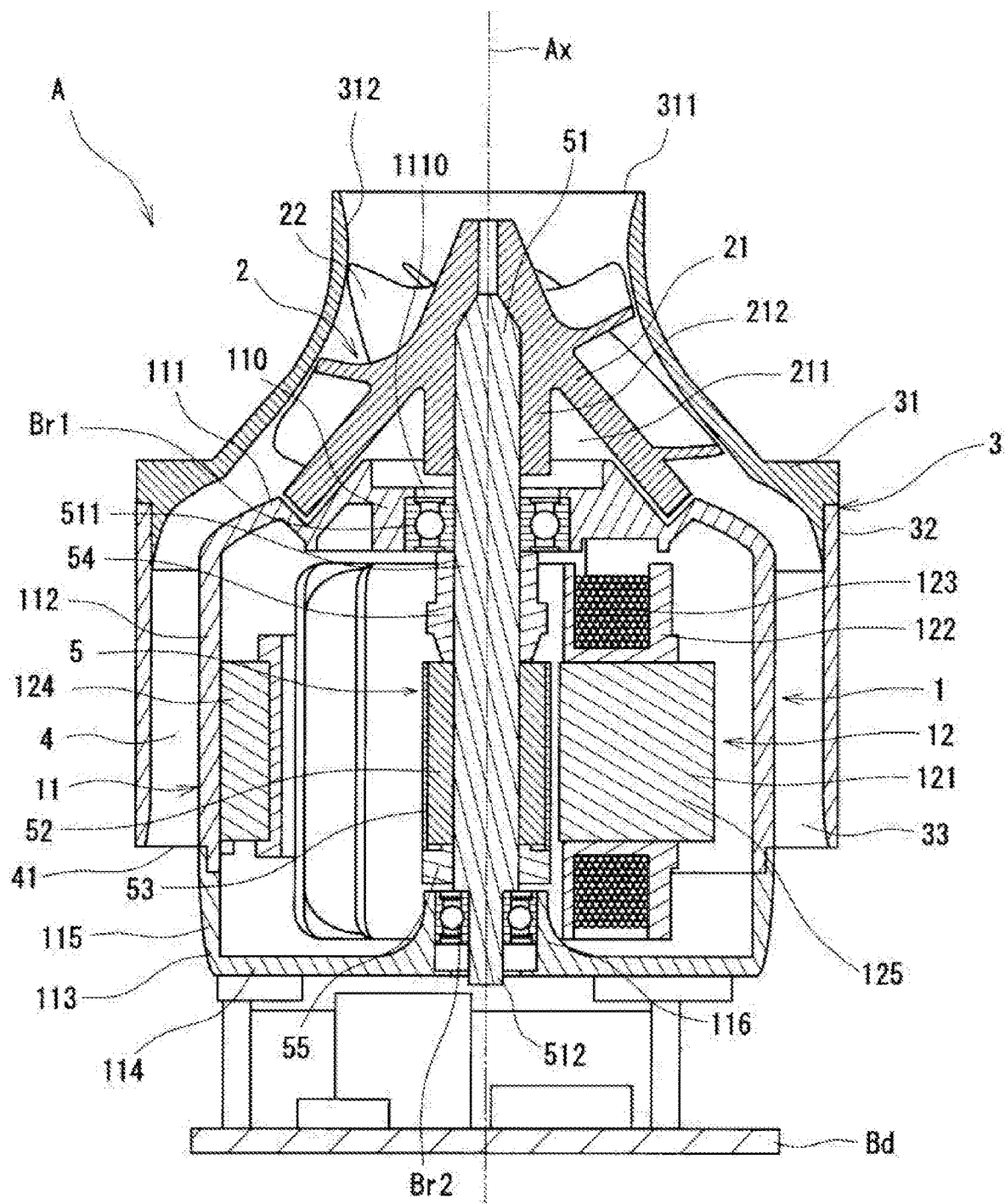
FIG. 2 is a longitudinal cross-sectional view of the blower illustrated in FIG. 1.
Figure 3:
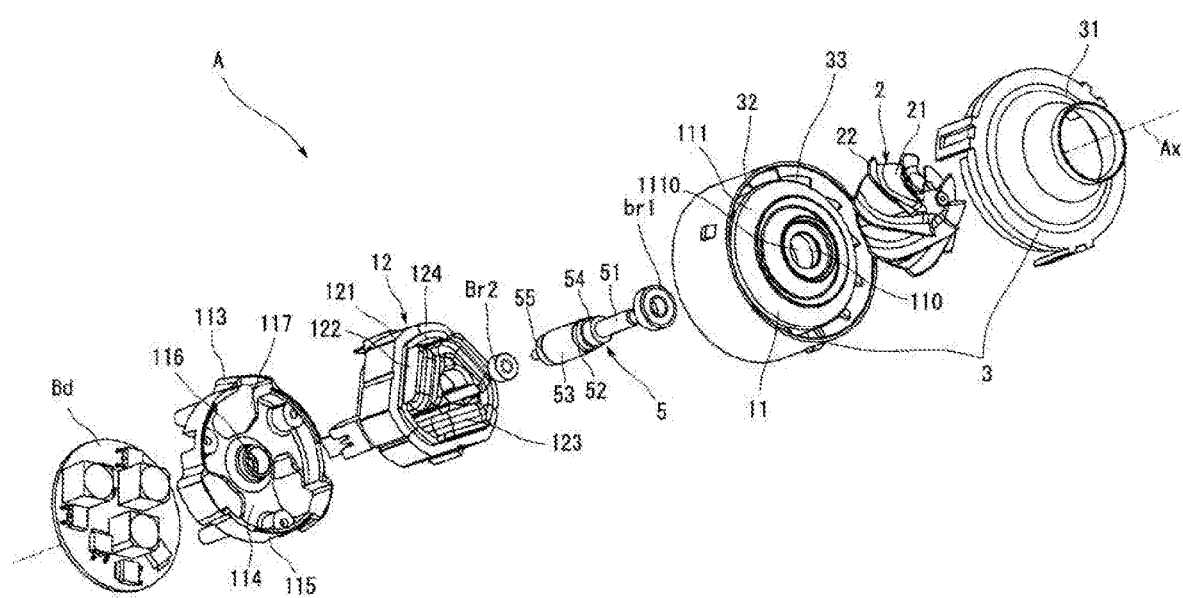
FIG. 3 is an exploded perspective view of the blower illustrated in FIG. 1.

FIG. 1 is a perspective view of the blower according to the embodiment. FIG. 2 is a longitudinal cross-sectional view of the blower illustrated in FIG. 1. FIG. 3 is an exploded perspective view of the blower illustrated in FIG. 1.

As illustrated in FIGS. 1 to 3, the blower A includes a motor 1, an impeller 2, a blower cover 3, and a board Bd. In the blower A, the motor 1 and the impeller 2 are disposed inside the blower cover 3. The motor 1 is disposed below the impeller 2 in the axial direction. Incidentally, the impeller 2 may be disposed in the axially lower side of the motor 1.

In addition, the board Bd is disposed below the motor 1 in the axial direction. In the blower A, a motor housing 11, which is an exterior of the motor 1, is disposed inside the blower cover 3 as illustrated in FIG. 3. A flow path 4 is formed in a gap between the blower cover 3 and the motor housing 11. An axially lower end of the flow path 4 is open toward the outside, and this opening serves as an exhaust port 41 to be described later. As the impeller 2 rotates about the central axis Ax, airflow is generated along the flow path 4 from the upper side to the lower side in the axial direction. The airflow flowing along the flow path 4 is discharged from the exhaust port 41 at the axially lower end.

As illustrated in FIG. 2, the motor 1 includes a motor housing 11, a stator 12, and a rotor assembly 5 (5C). The motor 1 is an inner rotor type brushless motor.

As illustrated in FIG. 2, the motor housing 11 is an exterior member that covers the outside of the motor 1. The motor housing 11 includes a motor housing upper lid portion 111, a motor housing tube portion 112, and a base member 113. The motor housing upper lid portion 111 and the motor housing tube portion 112 are integrally formed. The motor housing 11 can be made of metal, resin, or the like.

The motor housing upper lid portion 111 expands in a direction perpendicular to the central axis Ax. The motor housing upper lid portion 111 has a circular shape when viewed from the axial direction. As illustrated in FIG. 2, the motor housing upper lid portion 111 has a shape in which a radially central portion is directed to a radially inner side as proceeding axially upward. Further, the motor housing upper lid portion 111 has a tubular upper lid bearing holding portion 110 extending axially downward at the radially central portion. The center of the upper lid bearing holding portion 110 overlaps with the central axis Ax. An outer race of an upper bearing Br1 is fixed to a radially inner surface of the upper lid bearing holding portion 110. At this time, the center of the upper bearing Br1 overlaps with the central axis Ax. Further, the motor housing upper lid portion 111 has a lid through-hole 1110 penetrating in the axial direction at the radially central portion. The center of the lid through-hole 1110 overlaps with the central axis Ax.

The outer race of the upper bearing Br1 is fixed the upper lid bearing holding portion 110 by press-fitting. Incidentally, the fixing of the outer race of the upper bearing Br1 is not limited to press-fitting, and may be performed by adhesion or the like. Incidentally, the upper lid bearing holding portion 110 is integrally formed in the motor housing upper lid portion 111, but the present invention is not limited thereto, and the upper lid bearing holding portion 110 may be attached and fixed to the motor housing upper lid portion 111.

The motor housing tube portion 112 extends axially downward from a radially outer edge of the motor housing upper lid portion 111. The motor housing tube portion 112 has a cylindrical shape. In other words, the motor housing 11 has a covered cylindrical shape whose lower side is open. The base member 113 is connected to the axially lower surface of the motor housing tube portion 112.

The base member 113 is fixed to the motor housing tube portion 112 using a fixing tool such as a screw (not illustrated). The base member 113 covers the axially lower side of the motor housing tube portion 112. The base member 113 includes a bottom plate portion 114, a base tube portion 115, a base bearing holding portion 116, and a wiring through-hole 117 (see FIG. 3). The bottom plate portion 114 has a disk shape expanding in a direction crossing the central axis. The base tube portion 115 is a tubular body extending axially upward from a radially outer edge of the bottom plate portion 114. The upper end of the base tube portion 115 is connected to the lower end of the motor housing tube portion 112. As illustrated in FIG. 2, an upper end of the base tube portion 115 is disposed on the downstream side of the exhaust port 41. Thus, a direction (wind direction) of the airflow discharged from the exhaust port 41 can be adjusted by adjusting the shape of the radially outer surface of the base tube portion 115.

The base bearing holding portion 116 is a tubular body extending axially upward from a radially central portion of the bottom plate portion 114. When the base member 113 is fixed to the motor housing tube portion 112, the center of the base bearing holding portion 116 overlaps with the central axis Ax. Further, an outer race of a lower bearing Br2 is attached to an inner surface of the base bearing holding portion 116. As a result, the center of the lower bearing Br2 attached to the base bearing holding portion 116 overlaps with the central axis Ax.

The outer race of the lower bearing Br2 is fixed to the base bearing holding portion 116 by press-fitting. Incidentally, the fixing of the outer race of the lower bearing Br2 is not limited to press-fitting, and may be performed by adhesion or the like. Although the base bearing holding portion 116 is a member integrated with the bottom plate portion 114 in the base member 113, the present invention is not limited thereto, and the base bearing holding portion 116 may be attached and fixed to the bottom plate portion 114.

The board Bd is disposed below the base member 113 in the axial direction. A drive circuit (not illustrated) driving the motor 1 is provided on the board Bd. In addition, the wiring through-hole 117 (see FIG. 3) is provided in the bottom plate portion 114. A wiring (not illustrated) connecting a coil 123 (described later) of the stator 12 and the drive circuit of the board Bd passes through the wiring through-hole 117.

The stator 12 includes a stator core 121, and insulator 122, and a coil 123. The stator core 121 is a stacked body in which electromagnetic steel sheets are stacked in the axial direction (the up-down direction in FIG. 3). Note that the stator core 121 is not limited to a stacked body in which electromagnetic steel sheets are stacked, and may be a single member, such as a fired body of powder or a casting, for example.

The stator core 121 includes an annular core back 124 and a plurality of teeth 125. The plurality of teeth 125 is formed in a radial shape to extend axially inward from an inner peripheral surface of the core back 124. That is, the plurality of teeth 125 is disposed side by side in the circumferential direction. The insulator 122 covers outer surfaces of the teeth 125. The coil 123 is formed by winding a conductive wire around each of the teeth 125 with the insulator 122 interposed therebetween. The insulator 122 electrically insulates the coil 123 from the teeth 125.

In the stator core 121, the inner peripheral surface and an outer peripheral surface of the core back 124 are flat surfaces in the vicinity of roots of the teeth 125 as illustrated in FIG. 3. As a result, it is possible to effectively utilize a winding space to form the coil 123 while suppressing winding collapse in a periphery of a radially outer end of the coil 123. In addition, it is possible to reduce a loss by shortening a magnetic path. In addition, the inner peripheral surface and the outer peripheral surface of the core back 124 other than the vicinity of the roots of the teeth 125 are curved surfaces.

The curved surface portion of the core back 124 is in contact with an inner surface of the motor housing tube portion 112. At this time, the curved surface portion is press-fitted into the inner surface of the motor housing tube portion 112. Incidentally, the core back 124 may have a cylindrical shape without the flat surface.

A lead wire (not illustrated) passing through the wiring through-hole 117 is connected to the coil 123. One end of the lead wire is connected to a drive circuit (not illustrated) on the board Bd. As a result, electric power for driving is supplied to the coil 123.

The blower A of the embodiment is provided in the vacuum cleaner or the like. In the blower A, for example, a high-rotation motor capable of rotating at a rotational speed of 100,000 rotations per minute or more is adopted. In general, a smaller number of coils is more advantageous for high-speed rotation in the motor. Thus, the number of the coils 123 and the number of the teeth 125 in which the coil 123 are disposed are set to three in the motor 1. Three lines of currents having different phases three-phase currents) are sequentially supplied to the three coils 123. That is, the motor 1 is a three-phase three-slot motor. Incidentally, the three teeth 125 are disposed at equal intervals in the circumferential direction in order to rotate the motor 1 in a well-balanced manner.

Figure 4:
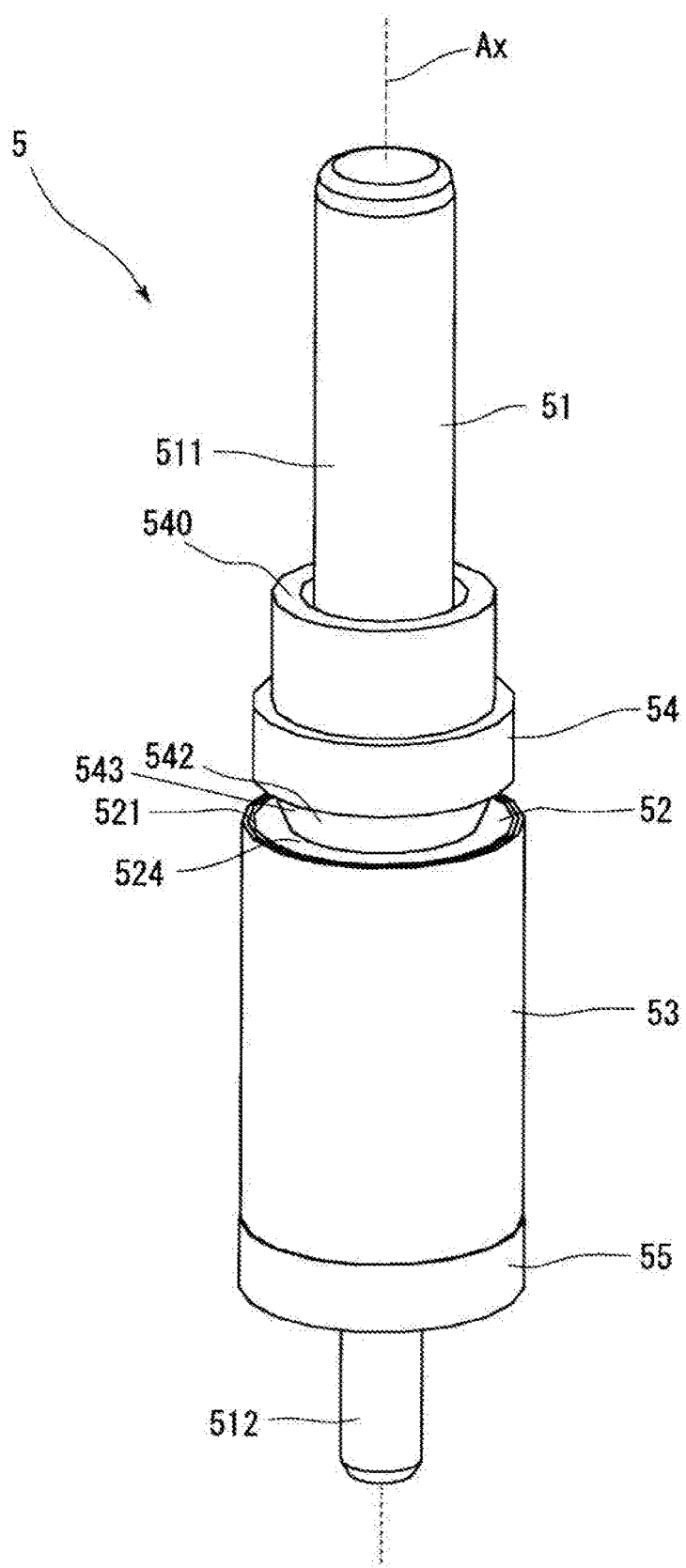
FIG. 4 is a perspective view of a rotor assembly.
Figure 5:
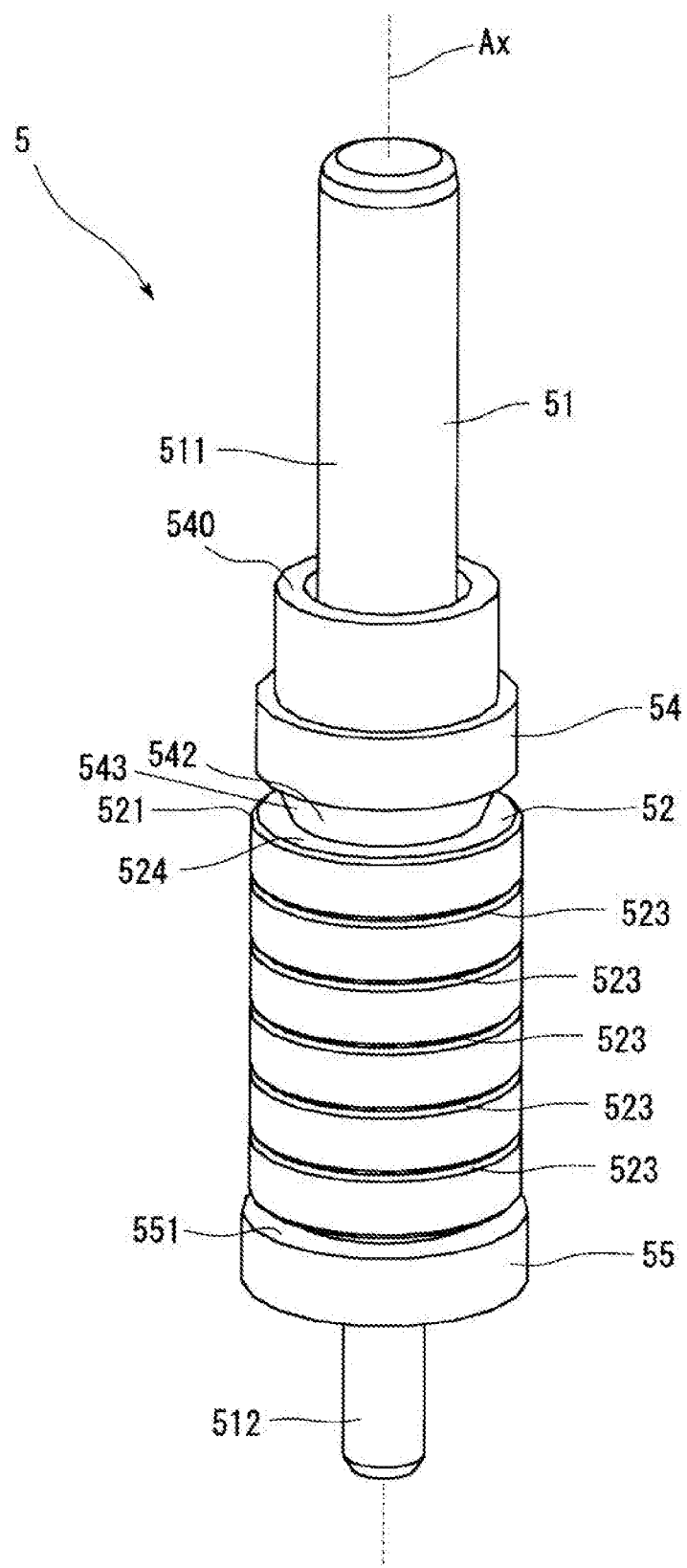
FIG. 5 is a perspective view illustrating a state where a magnet holder is removed from the rotor assembly illustrated in FIG. 4.
Figure 6:
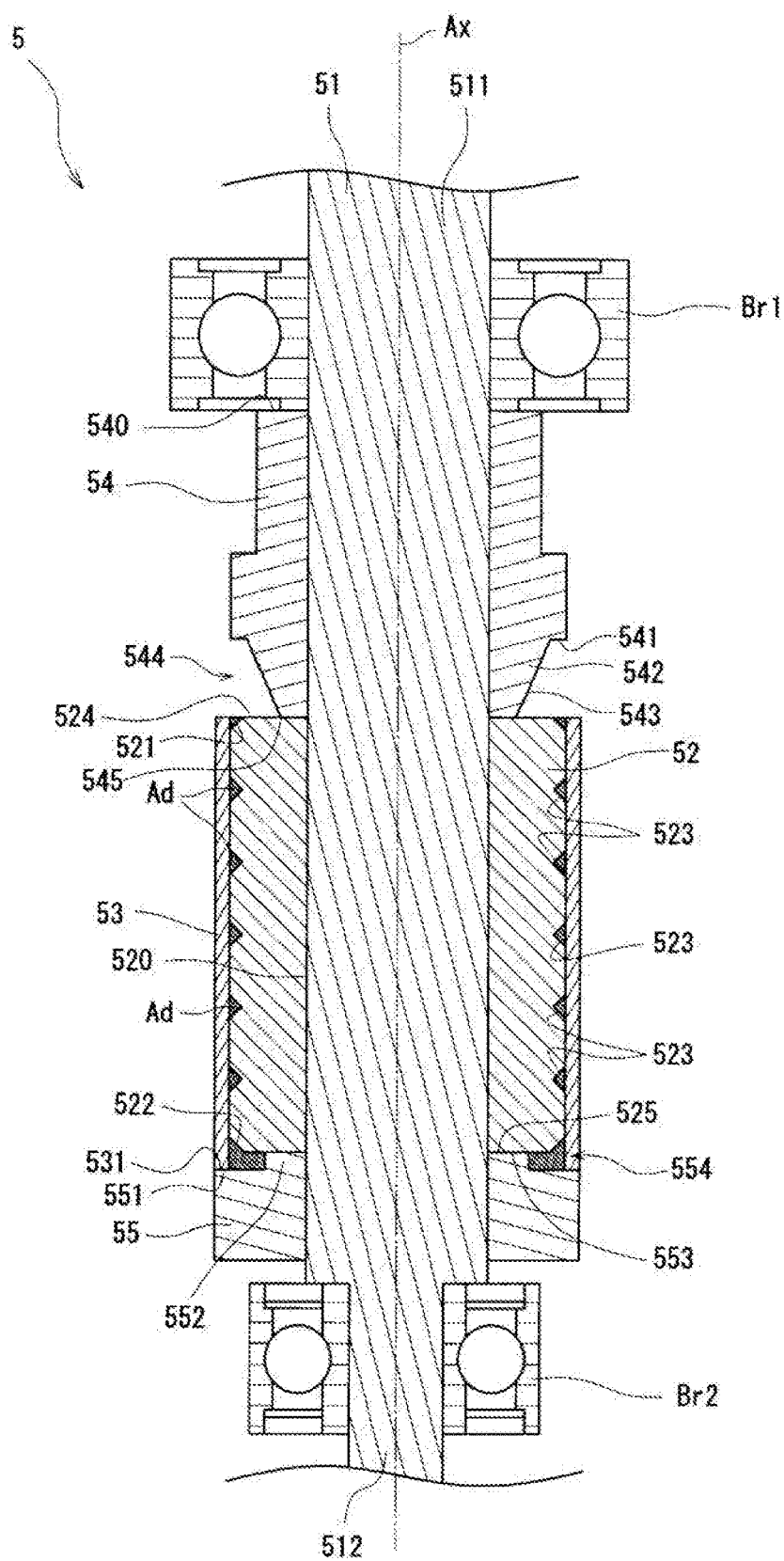
FIG. 6 is a longitudinal cross-sectional view of the rotor assembly illustrated in FIG. 4 cut along a plane including a central axis.
Figure 7:
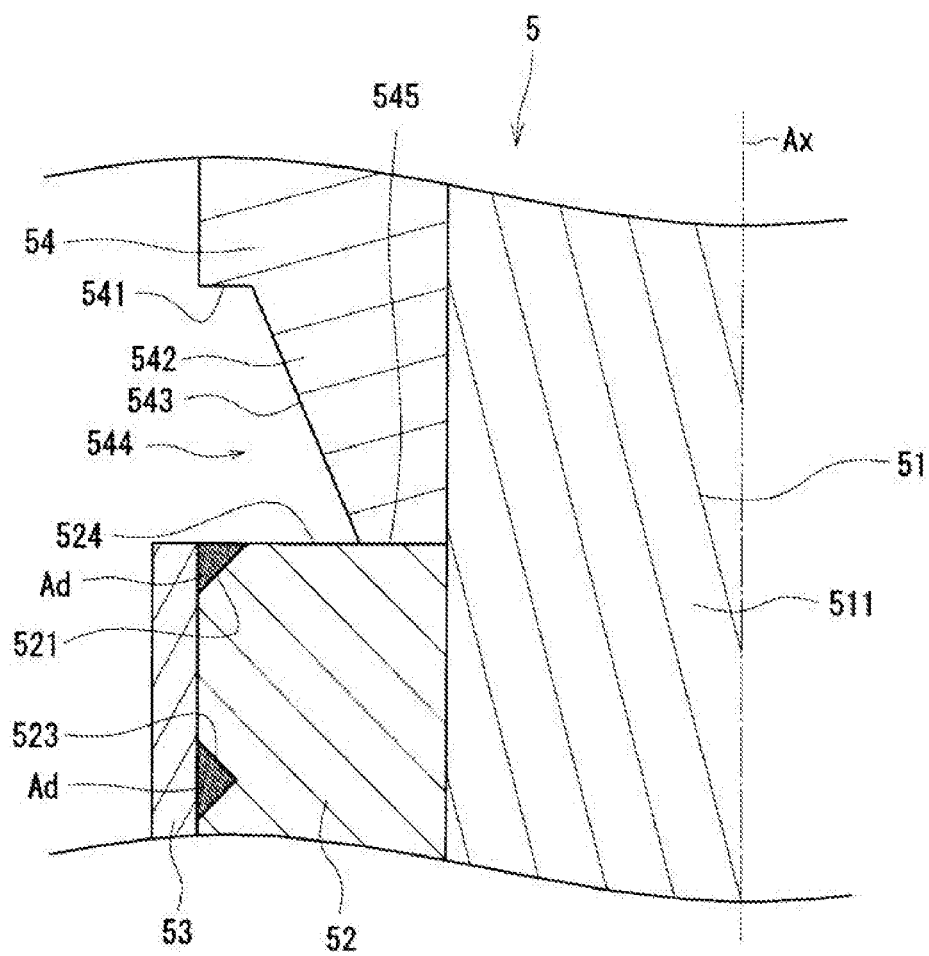
FIG. 7 is a longitudinal cross-sectional view illustrating a periphery of an axially upper end of a magnet of the rotor assembly.
Figure 8:
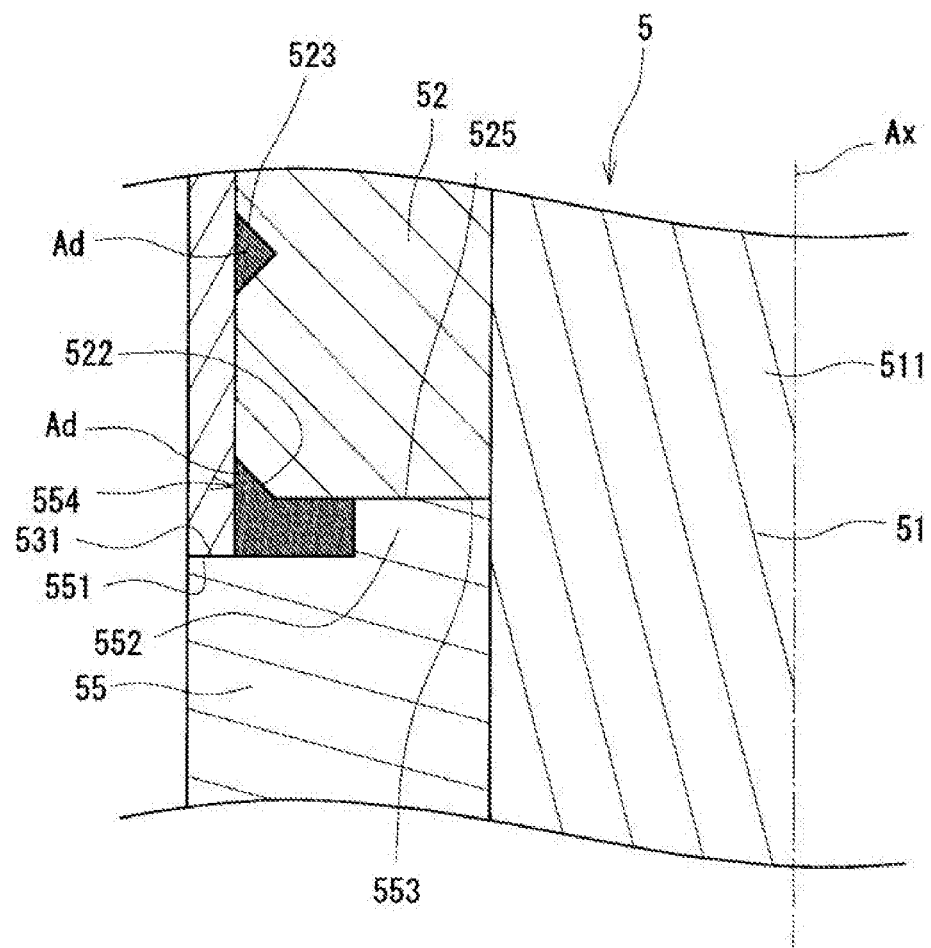
FIG. 8 is a longitudinal cross-sectional view illustrating a periphery of an axially lower end of the magnet of the rotor assembly.

Next, details of the rotor assembly 5 will be described with reference to new drawings. FIG. 4 is a perspective view of the rotor assembly. FIG. 5 is a perspective view illustrating a state where a magnet holder 53 is removed from the rotor assembly illustrated in FIG. 4. FIG. 6 is a cross-sectional view of the rotor assembly illustrated in FIG. 4 cut along a plane including the central axis. FIG. 7 is a longitudinal cross-sectional view illustrating a periphery of an axially upper end of a magnet of the rotor assembly. FIG. 8 is a longitudinal cross-sectional view illustrating a periphery of an axially lower end of the magnet of the rotor assembly. The cross-sectional views of the rotor assembly 7 and 8 are longitudinal cross-sectional views illustrating one side in the radial direction from of the central axis Ax, here, the left side in FIG. 6, in a cross section cut along the plane including the central axis Ax.

As illustrated in FIGS. 4 to 6, the rotor assembly 5 includes a shaft 51, a magnet 52, the magnet holder 53, an upper spacer 54, and a lower spacer 55.

The shaft 51 is disposed along the central axis Ax extending vertically. The shaft 51 includes a large-diameter portion 511 and a small-diameter portion 512. The large-diameter portion 511 has a columnar shape extending in the axial direction. The small-diameter portion 512 has a smaller outer diameter than the large-diameter portion 511. The small-diameter portion 512 is connected to an axially lower end of the large-diameter portion 511 and has a columnar shape extending in the axial direction.

The magnet 52, the upper spacer 54, the lower spacer 55, and the upper bearing Br1 are attached to the radially outer side of the large-diameter portion 511 as illustrated in FIG. 6 and the like. The lower bearing Br2 is mounted to the radially outer side of the small-diameter portion 512. The lower bearing Br2 is positioned in the axial direction by being brought into contact with a stepped portion formed by the large-diameter portion 511 and the small-diameter portion 512.

The magnet 52 has a tubular shape as illustrated in FIGS. 5 and 6. More specifically, the magnet 52 has a cylindrical shape in the rotor assembly 5. In the magnet 52, different magnetic poles (an N pole and an S pole) are disposed side by side in the circumferential direction. The motor 1 is configured to have one N pole and one S pole. In other words, the large-diameter portion 511 of the shaft 51 passes through the inside of the magnet 52. The inner diameter of the magnet 52 is equal to or slightly larger than the outer diameter of the large-diameter portion 511 of the shaft 51. Therefore, the magnet 52 is easily attached to the radially outer surface of the large-diameter portion 511 of the shaft 51. Details of a method of assembling the rotor assembly 5 will be described later.

The magnet 52 includes a magnet upper surface outer adhesive holding portion 521, a magnet lower surface outer adhesive holding portion 522, and five magnet grooves 523. The magnet upper surface outer adhesive holding portion 521 is provided on a radially outer edge of an axially upper surface of the magnet 52. The magnet upper surface outer adhesive holding portion 521 has an inclined surface directed axially downward as proceeding radially outward.

The magnet lower surface outer adhesive holding portion 522 is provided on a radially outer edge of an axially lower surface of the magnet 52. The magnet lower surface outer adhesive holding portion 522 has an inclined surface directed axially upward as proceeding radially outward. Both the magnet upper surface outer adhesive holding portion 521 and the magnet lower surface outer adhesive holding portion 522 have the inclined surface whose cross-sectional shape is linear, but the present invention is not limited thereto. For example, the inclined surface may be a bent surface having a curvilinear cross section or a shape changing stepwise. It is possible to broadly adopt a shape capable of storing an adhesive Ad, which will be described later, used at the time of fixing the magnet 52 and the magnet holder 53.

The magnet groove 523 is provided on the radially outer surface of the magnet 52. The magnet groove 523 is a groove that is recessed radially inward from the radially outer surface of the magnet 52 and extends in the circumferential direction. Incidentally, the magnet grooves 523 are formed over the entire circumference, and are continuous in the circumferential direction. The five magnet grooves 523 are provided on the radially outer surface of the magnet 52, and are disposed at equal intervals in the axial direction.

The magnet grooves 523 are disposed in a region between both axial ends on the radially outer surface of the magnet 52. On the other hand, the magnet upper surface outer adhesive holding portion 521 and the magnet lower surface outer adhesive holding portion 522 are provided on the axially upper end 524 and the axially lower end 525 of the magnet 52. Thus, the magnet grooves 523 are independent from the magnet upper surface outer adhesive holding portion 521, and the magnet lower surface outer adhesive holding portion 522.

Although the five magnet grooves 523 are provided in the magnet 52, the present invention is not limited thereto. It is possible to widely adopt the number of the magnet grooves 523 which enables the magnet 52 and the magnet holder 53 to be strongly fixed. Although the magnet grooves 523 are independent from each other, the present invention is not limited thereto. For example, the magnet grooves may be one or a plurality of spiral grooves. In addition, a cross-sectional shape of the magnet groove 523 when being cut along a plane perpendicular to the circumferential direction is a V shape, but the present invention is not limited thereto. For example, the shape may be a U shape, a rectangular shape, or a square shape. It is possible to broadly adopt a shape capable of storing an adhesive Ad, which will be described later, used at the time of fixing the magnet 52 and the magnet holder 53.

The magnet holder 53 has a cylindrical shape made of metal. The magnet holder 53 is fixed to the radially outer surface of the magnet 52 attached to the large-diameter portion 511 of the shaft 51. That is, the rotor assembly 5 further includes a tubular magnet holder 53 disposed on a radially outer side of the magnet 52. The magnet 52 and the magnet holder 53 are fixed by adhesion using the adhesive Ad. At this time, the adhesive Ad is collected in the magnet groove 523.

As a result, it is possible to increase the area of a surface of the adhesive which is in contact with the magnet 52 and to firmly fix the magnet 52 and the magnet holder 53. Thus, it is possible to increase the strength of the magnet 52 attached to the rotor assembly 5. Since the magnet holder 53 is fixed to the radially outer surface of the magnet 52, it is possible to more firmly fix the magnet 52 and the shaft 51. Since the adhesive Ad is collected in the magnet groove 523, it is possible to prevent the adhesive Ad from leaking to the outside.

The upper spacer 54 has a cylindrical shape made of metal. As illustrated in FIGS. 4 to 6, the upper spacer 54 is fixed to the radially outer side of the large-diameter portion 511 of the shaft 51 axially above the magnet 52. The large-diameter portion 511 and the upper spacer 54 are fixed by press-fitting. An upper spacer lower surface 541 has an upper spacer convex portion 542 extending in the axial direction from the radially central portion. An upper spacer enlarged portion 543 directed radially outward as proceeding axially upward is formed in the axial direction upward on a radially outer surface of the upper spacer convex portion 542.

A convex portion lower surface 545, which is an axially lower surface of the upper spacer convex portion 542, is in contact with the magnet upper surface 524. In addition, the upper spacer lower surface 541 and the magnet upper surface 524 oppose each other in the axial direction to form a gap 544.

That is, a radially outer edge of the convex portion lower surface 545 in contact with the magnet 52 of the upper spacer 54 is not in contact with the magnet 52. Thus, a magnetic flux from the upper surface of the magnet 52 hardly escapes to the upper spacer 54 side so that magnetic characteristics can be improved. That is, the magnetic flux can be prevented from flowing from the axially upper end of the magnet 52 to the upper spacer 54 by providing the gap 544.

Since the magnetic characteristics of the rotor assembly 5 are improved, the rotation efficiency of the motor 1 can be improved. In addition, an outer diameter of a portion where an outer diameter of the upper spacer 54 is the largest is equal to an inner diameter of the magnet holder 53 or smaller than the inner diameter of the magnet holder 53. Although details will be described later, the magnet holder 53 passes through the radially outer side of the upper spacer 54 to be movable to a position surrounding the radially outer side of the magnet 52, arranged axially below the upper spacer 54, from axially above the upper spacer 54 at the time of assembling.

The lower spacer 55 has an annular shape made of metal. The lower spacer 55 is fixed to the radially outer side of the large-diameter portion 511 of the shaft 51 axially below the magnet 52. The large-diameter portion 511 and the lower spacer 55 are fixed by press-fitting. A lower spacer upper surface 551, which is an axially upper surface of the lower spacer 55, has a lower spacer convex portion 552 extending axially upward from the radially central portion. The lower spacer convex portion 552 is a tubular body.

A convex portion upper surface 553, which is an axially upper surface of the lower spacer convex portion 552, is in contact with the magnet lower surface 525. At this time, the lower spacer upper surface 551 and the magnet lower surface 525 oppose each other in the axial direction to form a gap 554. It is possible to prevent a magnetic flux from flowing from the axially lower end of the magnet 52 to the lower spacer 55 by providing the gap 554. As a result, the magnetic characteristics of the rotor assembly 5 can be improved, and the rotation efficiency of the motor 1 can be enhanced.

In the rotor assembly 5, the lower spacer 55, the magnet 52, and the upper spacer 54 are fixed to the large-diameter portion 511 of the shaft 51 in this order from the axially lower side. The magnet holder 53 is fixed to the radially outer surface of the magnet 52.

An inner race of the lower bearing Br2 is fixed to the small-diameter portion 512 axially below the shaft 51. At this time, the inner race comes in contact with the stepped portion of the large-diameter portion 511 and the small-diameter portion 512. That is, the inner race of the lower bearing Br2 is in contact with an axially lower end surface of the large-diameter portion 511. As a result, the lower bearing Br2 is positioned in the axial direction with respect to the shaft 51.

In addition, the lower spacer 55 is fixed with a gap above the lower bearing Br2 of the large-diameter portion 511 in the axial direction as illustrated in FIG. 6. The convex portion upper surface 553 of the lower spacer 55 is in contact with the magnet lower surface 525. As a result, the magnet 52 is positioned in the axial direction with respect to the shaft 51 by the lower spacer 55.

An axially lower surface 531 at an axially lower end of the magnet holder 53 covering the radially outer surface of the magnet 52 is in contact with the lower spacer upper surface 551. As a result, the magnet holder 53 is positioned in the axial direction with respect to the shaft 51 by the lower spacer 55.

The axially lower surface 531 is in contact with the lower spacer upper surface 551 over the entire circumference in the circumferential direction. As a result, it is possible to prevent the magnet holder 53 from being inclined with respect to the central axis Ax. In addition, the magnet 52 held by the magnet holder 53 on the radially outer surface is also prevented from being inclined with respect to the central axis Ax.

The adhesive Ad fixing the magnet 52 and the magnet holder 53 is collected in the gap 554 between the lower spacer upper surface 551 and the magnet lower surface 525.

In addition, the axially lower surface 531 is in contact with the lower spacer upper surface 551 over the entire circumference in the circumferential direction. Thus, the adhesive Ad hardly leaks radially outward from the gap between the lower spacer upper surface 551 and the axially lower surface 531.

As described above, the motor 1 is the inner rotor type brushless motor including the motor housing 11, the stator 12, and the rotor assembly 5. In the motor 1, the rotor assembly 5 is rotatably disposed at the radially inner side of the stator 12 as illustrated in FIG. 2 and the like. That is, the stator 12 opposes the radially outer surface of the rotor assembly 5 (5C) in the radial direction. As the radially outer surface of the curved surface portion of the core back 124 of the stator 12 is press-fitted into the inner surface of the motor housing tube portion 112, the core back 124 is fixed to the motor housing tube portion 112. That is, the motor housing 11 holds the stator 12. Incidentally, the fixing of the core back 124 to the motor housing tube portion 112 is not limited to press-fitting but other methods such as adhesion can also be used.

The shaft 51 of the rotor assembly 5 is rotatably supported by the motor housing 11 via the upper bearing Br1 and the lower bearing Br2. That is, the motor housing 11 rotatably supports the rotor assembly 5 (5C). Specifically, the shaft 51 is supported by the motor housing upper lid portion 111 via the upper bearing Br1, and further, is rotatably supported by the base member 113 via the lower bearing Br2. As described above, both the centers of the upper bearing Br1 and the lower bearing Br2 overlap with the central axis Ax. Thus, the center of the shaft 51 supported by the upper bearing Br1 and the lower bearing Br2 also overlaps with the central axis Ax. The shaft 51 is supported so as to be rotatable about the central axis Ax by an upper bearing Br1 and the lower bearing Br2.

Since the shaft 51 is held so as to be rotatable about the central axis Ax in the motor housing 11, at least the magnet 52 of the rotor assembly 5 opposes radially inner surfaces of the teeth 125 of the stator 12 in the radial direction. That is, at least the magnet 52 opposes the teeth 125 and is rotatable about the central axis Ax with respect to the stator 12. In the magnet 52, the N poles and the S poles are disposed alternately in the circumferential direction. As a current is supplied to the coil 123 at a predetermined timing for excitation, the rotor assembly 5 rotates about the central axis Ax due to a magnetic force between the magnet 52 and the coil 123.

In the rotor assembly 5, the upper spacer upper surface 540 is brought into contact with the inner race of the upper bearing Br1 to position the magnet 52 in the axial direction with respect to the teeth 125. In addition, the upper spacer upper surface 540 of the upper spacer 54 pushes the inner race of the upper bearing Br1 upward. As a result, an appropriate preload acts on the upper bearing Br1.

On the other hand, the lower spacer 55 is disposed with a gap in the axial direction with respect to the lower bearing Br2. Since the lower spacer 55 is disposed with the gap in the axial direction with respect to the lower bearing Br2, an axial position of the magnet 52 with respect to the teeth 125 can be adjusted to an appropriate position by changing the position of the lower spacer 55 even if an axial length of the magnet 52 changes (varies).

As the large-diameter portion 511 of the shaft 51 is inserted into the inner race of the upper bearing Br1 held by the upper lid bearing holding portion 110 and the upper spacer upper surface 540 is brought into contact with the inner race of the upper bearing Br1, the axially upper end of the large-diameter portion 511 passes through the lid through-hole 1110 and protrudes axially upward from the motor housing upper lid portion 111. The impeller 2 is fixed to a distal end part of the large-diameter portion 511 protruding upward from the motor housing upper lid portion 111. Details of the impeller 2 will be described later.

As described above, the motor 1 has the rotor assembly 5, the stator 12, and the motor housing 11, and thus, the magnet holder 53 can be positioned in the axial direction by bringing the lower surface of the magnet holder 53 into contact with the lower spacer 55 in the motor 1. Since the magnet holder 53 covers the radially outer side of the magnet 52, it is possible to more firmly fix the magnet 52 and the shaft 51.

Figure 9:
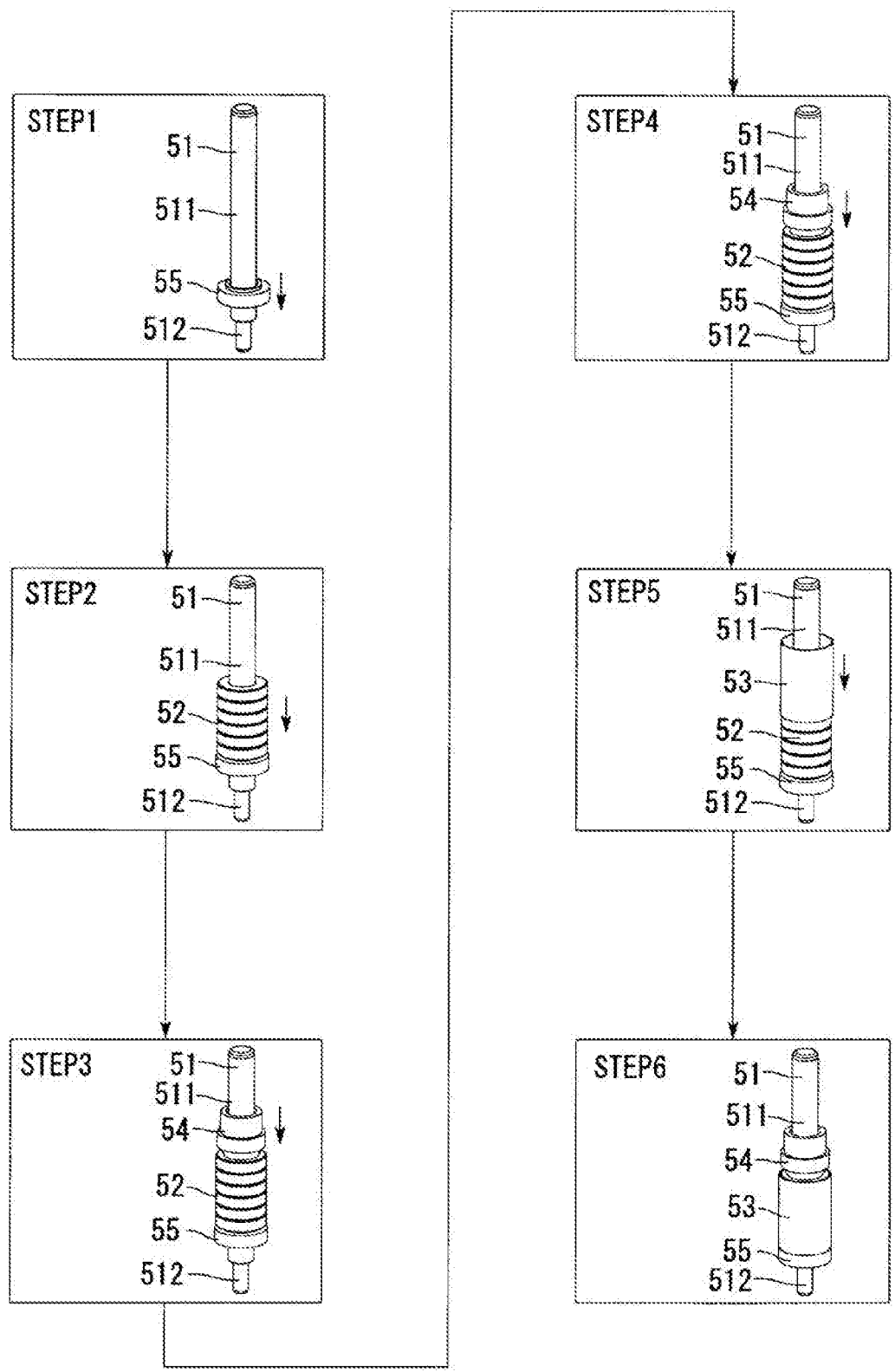
FIG. 9 is a view illustrating a manufacturing procedure of the rotor assembly.

Next, an assembling process of the rotor assembly 5 will be described with reference to the drawings. FIG. 9 is a view illustrating a manufacturing procedure of the rotor assembly 5. Although a manufacturing method of the rotor assembly 5 is divided into a plurality of steps in FIG. 9, the steps are merely set for convenience, and the present invention is not limited to these steps. For example, the respective steps may be performed continuously without interruption or may include another step.

First, the lower spacer 55 is attached to the shaft 51 as illustrated in a first step (STEP 1) of FIG. 9. The lower spacer 55 is press-fitted into the large-diameter portion 511 of the shaft 51. It is also possible to attach the lower spacer 55 from an axially lower end of the shaft 51.

The lower spacer 55 is moved axially downward in a later step (a fourth step: STEP 4). When a movement direction in the fourth step (STEP 4) and a press-fitting direction in the first step (STEP 1) are opposite, there is a possibility that fixing strength of the lower spacer 55 with respect to the shaft 51 decreases after the movement. Therefore, the press-fitting direction in the first step (STEP 1) is preferably the same as the movement direction in the fourth step (STEP 4). That is, here, the lower spacer 55 is press-fitted into the large-diameter portion 511 from an axially upper end of the shaft 51. In the first step (STEP 1), the position of the lower spacer 55 on the shaft 51 is temporarily fixed axially above a final position, for example, a position set when designed. That is, the first step (STEP 1) is a step of temporarily fixing the lower spacer 55 to the shaft 51.

In the next second step (STEP 2), the magnet 52 is attached from the axially upper end of the large-diameter portion 511 of the shaft 51. The inner diameter of the magnet 52 is equal to or slightly larger than the outer diameter of the large-diameter portion 511. Thus, the magnet 52 can be easily mounted to the large-diameter portion 511 when attaching the magnet 52 to the large-diameter portion 511.

Incidentally, the adhesive Ad may be used for fixation in order to more firmly fix the large-diameter portion 511 and the magnet 52. In this case, the adhesive Ad is applied to the axially upper side of the lower spacer 55 on the radially outer surface of the large-diameter portion 511 of the shaft 51 to which the lower spacer 55 has been attached before attaching the magnet 52 in the second step (STEP 2). When the magnet 52 is attached to the large-diameter portion 511 from the axially upper end, a part of the adhesive Ad applied to the radially outer surface of the large-diameter portion 511 is pushed against the magnet lower surface 525. In addition, the remaining adhesive Ad infiltrates between the radially outer surface of the large-diameter portion 511 and the radially inner surface 520 of the magnet 52. As a result, the large-diameter portion 511 of the shaft 51 and the magnet 52 can be attached by the adhesive Ad.

In a third step (STEP 3), the upper spacer 54 is press-fitted from the axially upper end of the shaft 51. Then, the convex portion lower surface 545 of the upper spacer convex portion 542 of the upper spacer 54 is brought into contact with the magnet upper surface 524. Incidentally, when the adhesive Ad is applied to the radially outer surface of the large-diameter portion 511 in the second step (STEP 2), the third step (STEP 3) and the subsequent fourth step (STEP 4) are executed before the adhesive Ad is fixed, that is, before the fixing is completed.

In the fourth step (STEP 4), the upper spacer 54 is further pushed downward in the axial direction. As a result, the convex portion lower surface 545 of the upper spacer 54 pushes the magnet upper surface 524 axially downward. As a result, the lower spacer 55 in axial contact with the magnet 52 and the magnet lower surface 525 is pushed axially downward. As a result, the magnet 52 and the lower spacer 55 move axially downward with respect to the shaft 51. Then, the lower spacer 55, the magnet 52, and the upper spacer 54 are moved until the upper spacer upper surface 540 reaches a set position in the axial direction. Incidentally, the position of the upper spacer upper surface 540 is a position where the axially lower surface of the inner race of the upper bearing Br1 attached to the shaft 51 is in contact.

The rotor assembly 5 is held by the motor housing upper lid portion 111 via the upper bearing Br1 and is held by the base member 113 via the lower bearing Br2. At this time, the rotor assembly 5 is positioned in the axial direction. The lower bearing Br2 is positioned by the step of the large-diameter portion 511 and the small-diameter portion 512 of the shaft 51. On the other hand, the rotor assembly 5 is positioned with respect to the motor housing 11 as the upper spacer upper surface 540 is brought into contact with the upper bearing Br1. The positioning of the upper bearing Br1 with respect to the motor housing 11 is performed by attaching the outer race thereof to the upper lid bearing holding portion 110. As a result, the upper bearing Br1 is in the state of being positioned with respect to the stator 12. The axial positions of the magnet 52 of the rotor assembly 5 and the teeth 125 of the stator 12 are adjusted by adjusting the position of the upper spacer upper surface 540 in the fourth step (STEP 4).

In the assembling process of the rotor assembly 5, the lower spacer 55 is once temporarily fixed axially above the set position in the first step (STEP 1), and then, is further pushed axially downward in the third step (STEP 3) and the fourth step (STEP 4). In this manner, for example, even when the axial length of the magnet 52 varies, it is possible to suppress an axial position of the upper spacer upper surface 540 that is caused by variations in manufacturing.

In a fifth step (STEP 5), the adhesive Ad is applied to the radially outer surface of the magnet 52, and then, the magnet holder 53 is attached from the axially upper end side. As described above, an outermost diameter of the upper spacer 54 is smaller than the inner diameter of the magnet holder 53. Thus, the magnet holder 53 passes the radially outer side of the upper spacer 54 from the upper side to the lower side in the axial direction. Then, the magnet holder 53 is disposed on the radially outer side of the magnet 52 disposed axially below the upper spacer 54. At this time, the axially lower surface 531 pushes the adhesive Ad applied to the radially outer surface of the magnet 52 axially downward due to the downward movement of the magnet holder in the axial direction. At this time, the adhesive Ad is collected in the magnet groove 523 (see FIGS. 6 and 7). In addition, the adhesive Ad is collected in the magnet lower surface outer adhesive holding portion 522. As a result, the contact area between the magnet 52 and the adhesive Ad increases so that the strength of fixing the magnet 52 and the magnet holder 53 can be enhanced.

In addition, since the contact area between the adhesive Ad and the magnet lower surface outer adhesive holding portion 522 increases, the adhesive hardly leaks due to the surface tension.

In a sixth step (STEP 6), the magnet holder 53 is further moved axially downward. At this time, the adhesive Ad remaining without being collected in the magnet groove 523 out of the adhesive Ad applied to the radially outer surface of the magnet 52 is pushed axially downward by the axially lower surface 531. Then, the adhesive Ad is accommodated in the gap 554 between the magnet lower surface 525 of the magnet 52 and the lower spacer upper surface 551 of the lower spacer 55. The axially lower surface 531 of the magnet holder 53 is brought into contact with the lower spacer upper surface 551 of the lower spacer 55, thereby ending the manufacture of the rotor assembly 5. The axially lower surface 531 of the magnet holder 53 is in contact with the lower spacer upper surface 551 over the entire circumference in the circumferential direction (see FIGS. 6, 8, and the like). As a result, it is possible to prevent the adhesive Ad accommodated in the gap 554 between the magnet lower surface 525 and the lower spacer upper surface 551 from leaking radially outward from the gap between the magnet holder 53 and the lower spacer 55.

When the magnet holder 53 is mounted to the radially outer side of the magnet 52, the axially upper end of the magnet holder 53 opposes the magnet upper surface outer adhesive holding portion 521 in the radial direction. When attaching the magnet holder 53 to the radially outer surface of the magnet 52 with the adhesive Ad, the adhesive Ad may leak to the magnet upper surface 524 in some cases. In the embodiment, however, the adhesive Ad on the magnet upper surface 524 flows into the magnet upper surface outer adhesive holding portion 521 to be held by the magnet upper surface outer adhesive holding portion 521 (see FIGS. 6, 7, and the like). As a result, it is possible to prevent the adhesive Ad from flowing radially outward beyond the axially upper end of the magnet holder 53. Since the adhesive Ad is collected in the magnet upper surface outer adhesive holding portion 521, the area in contact with the adhesive Ad increases. As a result, the adhesion between the magnet 52 and the magnet holder 53 becomes stronger so that the strength of the magnet 52 can be improved. Incidentally, the assembling process of the rotor assembly 5 illustrated in FIG. 9 is merely an example, and the present invention is not limited to this assembling process.

That is, since the magnet upper surface outer adhesive holding portion 521 is provided at the axially upper end of the magnet 52, the contact area between the adhesive Ad and the magnet 52 increases when the adhesive Ad is collected in the magnet upper surface outer adhesive holding portion 521. Thus, the fixing strength between the magnet 52 and the magnet holder 53 can be improved. In addition, since the contact area between the adhesive Ad and the magnet 52 increases, the adhesive Ad hardly flows beyond the axially upper end of the magnet holder 53 due to the surface tension so that it is possible to prevent the adhesive Ad from leaking to the outside.

In addition, since the magnet lower surface outer adhesive holding portion 522 is provided at the axially lower end of the magnet 52, the contact area between the magnet 52 and the adhesive Ad increases, and the fixing strength between the magnet 52 and the magnet holder 53 can be improved. In addition, since the contact area between the adhesive Ad and the magnet 52 increases, the surface tension of the adhesive Ad collected in the magnet lower surface outer adhesive holding portion 522 increases. As a result, the adhesive hardly flows into the gap 554 between the magnet lower surface 525 and the lower spacer upper surface 551 so that it is possible to prevent the adhesive Ad from leaking to the outside.

As described above, the rotor assembly 5 is configured such that the magnet holder 53 is attached to the radially outer side of the magnet 52 sandwiched between the upper spacer 54 and the lower spacer 55, and has a simple structure. In addition, the assembling is easy since the assembling is completed by applying the adhesive to the magnet 52 after fixing the magnet 52 in the axial direction by the upper spacer 54 and the lower spacer 55, and causing the magnet holder 53 to pass through the radially outer side of the upper spacer 54 to be fixed to the radially outer side of the magnet 52 using the adhesive.

Next, the impeller 2 will be described. As illustrated in FIG. 2, the impeller 2 is a so-called mixed flow impeller formed using a resin molded article. The impeller 2 has an impeller base portion 21 and a plurality of blades 22. Examples of the resin forming the impeller 2 can include a resin called engineering plastic. The engineering plastic is a resin whose mechanical properties such as strength and heat resistance are superior to other resins. Incidentally, the impeller 2 may be made of a material such as metal. A diameter of the impeller base portion 21 becomes longer as proceeding downward. That is, the impeller includes the impeller base portion 21 which expands radially outward as proceeding axially downward. In other words, the impeller base portion 21 gradually expands in diameter downward.

The impeller base portion 21 includes a lower surface concave portion 211 and a boss portion 212. The shaft 51 is press-fitted at the center (on the central axis Ax) of the boss portion 212. As a result, the boss portion 212 and the shaft 51 are connected, and the impeller 2 rotates about the central axis Ax. The boss portion 212 has a cylindrical shape. That is, the impeller 2 is fixed to the shaft 51.

The plurality of blades 22 is disposed on an upper surface of the impeller base portion 21. That is, the impeller 2 includes the plurality of blades 22 disposed on the upper surface of the impeller base portion 21. In the impeller 2, the blades 22 are juxtaposed at a predetermined interval in the circumferential direction on the upper surface of the impeller base portion 21, and are integrally molded with the impeller base portion 21. An upper portion of the blade 22 is disposed forward in a rotation direction with respect to a lower portion.

The lower surface concave portion 211 recessed axially upward is provided at a radially outer side of the boss portion 212 on a lower surface of the impeller base portion 21. That is, the impeller base portion 21 has the lower surface concave portion 211 formed as the lower surface of the impeller base portion 21 is recessed axially upward, at the radially outer side of the boss portion 212. Since the lower surface concave portion 211 is provided in the impeller base portion 21, it is possible to reduce the weight of the impeller base portion 21. It is possible to reduce power consumption by reducing the weight of the impeller 2, which is a rotational portion, and it becomes easy to rotate the impeller 2 at high speed. In addition, it is possible to suppress a sink mark at the time of molding the impeller 2.

In addition, a part of the motor housing upper lid portion 111 is housed inside the lower surface concave portion 211. The upper bearing Br1 attached to the upper lid bearing holding portion 110 is disposed inside the lower surface concave portion 211 in the axial direction. That is, the axially upper surface of the upper bearing Br1 is disposed above an axially lower end of the impeller base portion 21. As a result, the upper bearing Br1 can be brought close to the axially upper end of the shaft 51, and it is possible to prevent rotation of the shaft 51 from being shaken.

Next, the blower cover 3 will be described. The blower A includes the blower cover 3. The blower cover 3 has a tubular shape that surrounds the radially outer side of the motor 1 and the impeller with a gap. That is, the blower cover 3 has a tubular shape that opposes the radially outer surfaces of the motor 1 and the impeller 2. The blower cover 3 includes an upper cover 31 and a lower cover 32.

The upper cover 31 is disposed at least on a radially outer side of the impeller 2. The upper cover 31 serves as a guide that directs the flow of airflow generated by rotation of the impeller 2 in the axial direction. The upper cover 31 has the intake port 311 that is open in the up-down direction (axial direction). In addition, the intake port 311 has a shape of a bell mouth 312 which is bent inward from an upper end and extends downward. As a result, a diameter of the intake port 311 smoothly decreases from the upper side to the lower side. Since the intake port 311 has the shape of the bell mouth 312, air can be smoothly sucked therein. As a result, the amount of air sucked from the intake port 311 increases as the impeller 2 rotates. Accordingly, it is possible to enhance the air blowing efficiency of the blower A.

In the blower A of the embodiment, a lower end of the upper cover 31 is fixed to the lower cover 32. The lower cover 32 has a tubular shape of which cross section perpendicular to the central axis Ax is circular and which extends in the axial direction. The lower cover 32 has openings at an upper end and a lower end. The upper end of the lower cover 32 is connected to the lower end of the upper cover 31. The lower end of the upper cover 31 is inserted into the lower cover 32. An inner surface of the upper cover 31 continues smoothly to an inner surface of the lower cover 32, for example, in a differentiable manner. As a result, an inner surface of the blower cover 3 is smoothed to suppress disturbance of airflow.

As a method of fixing the upper cover 31 and the lower cover 32, for example, a convex portion is provided on an outer surface of the lower cover 32. In addition, the upper cover 31 is provided with a beam portion which extends axially downward and has a concave portion recessed radially outward in an inner surface on a distal end side. Then, when the upper cover 31 is moved in the axial direction toward the lower cover 32, the beam portion is bent and the convex portion of the lower cover 32 is inserted into the concave portion of the beam portion of the upper cover 31 to be fixed. The fixing method is not limited thereto, and it is possible to widely adopt a fixing method capable of suppressing movement in the axial direction and the circumferential direction. It is preferable to enable positioning in the circumferential direction and to make attachment and detachment easy. In addition, the upper cover 31 and the lower cover 32 may be molded as an integrated member.

The lower cover 32 is disposed on the radially outer side of the motor housing 11. The airflow generated by rotation of the impeller 2 flows in the flow path 4, formed in a radial gap between the lower cover 32 and the motor housing 11, from the axially upper side toward the axially lower side.

A plurality of stationary blades 33 is disposed in the circumferential direction at equal intervals in the gap between the lower cover 32 and the motor housing 11. That is, the plurality of stationary blades 33 is disposed inside the flow path 4 constituted by the lower cover 32 and the motor housing 11. The stationary blades 33 are disposed at equal intervals in the circumferential direction on the radially outer surface of the motor housing 11. The stationary blade 33 has a plate shape, and is inclined toward a direction opposite to the rotation direction of the impeller 2 as proceeding upward. The impeller 2 is a mixed flow fan, and the generated air flow has not only a velocity component in an axially downward direction but also a velocity component in the circumferential direction. The velocity component in the circumferential direction of the airflow is directed axially downward by the stationary blade 33. That is, the plurality of stationary blades 33 is juxtaposed in the circumferential direction and guides the airflow downward when the blower A is driven.

Radially inner ends of the plurality of stationary blades 33 are in contact with the radially outer surface of the motor housing 11. In addition, radially outer ends of the plurality of stationary blades 33 are in contact with the blower cover 3, that is, a radially inner surface of the lower cover 32. In addition, the contact between the stationary blade 33 and the motor housing 11 includes not only a case where these different members are in contact with each other but also a case where these members are formed by integral molding.

As the motor 1 generates heat in the coil 123 and the surroundings thereof along with rotation. The heat is transmitted to the motor housing 11. Since the outer surface of the motor housing 11 is in contact with the stationary blade 33, the heat transmitted to the motor housing 11 is transmitted to the stationary blade 33. The stationary blade 33 is disposed inside the flow path 4, and the heat transmitted to the stationary blade 33 is dissipated by the airflow. That is, the stationary blade 33 is a rectifying member that rectifies the airflow and also functions as a heat-dissipating fin that discharges the heat of the motor 1 to the outside. As a result, the heat generated in the coil 123 and the vicinity thereof can be efficiently released to the outside.

Although the motor housing 11, the lower cover 32, and the stationary blades 33 are integrally molded in the blower A according to the embodiment, the present invention is not limited thereto. For example, the stationary blade 33 may be integrated with one of the motor housing 11 and the lower cover 32, and brought into contact with the other. When the lower cover 32 is formed as a separate body from the motor housing 11, the upper cover 31 and the lower cover 32 may be integrated. Further, each of the motor housing 11, the lower cover 32, and the stationary blade 33 may be formed as a separate body.

A description will be given regarding an operation of the blower A described above. In the blower A, the rotor assembly 5 rotates about the central axis Ax when the motor 1 is driven. At this time, the impeller 2 fixed to the shaft 51 rotates. Due to the rotation of the impeller, the air outside the blower cover 3 is taken into the blower cover 3 from the intake port 311. At this time, since the bell mouth 312 is provided in the intake port 311, the amount of air sucked from the intake port 311 increases, and the air is smoothly guided between the adjacent blades 22. Therefore, the air blowing efficiency of the blower A can be improved.

The air taken into the inside of the upper cover 31 flows between the adjacent blades 22 and is accelerated downward on the radially outer side by the rotating impeller 2. The air accelerated downward on the radially outer side is blown out to the lower side of the impeller 2. The air blown out to the lower side of the impeller 2 flows into the flow path 4 in the gap between the motor housing 11 and the lower cover 32. The air (airflow) flown into the flow path 4 flows between the stationary blades 33 adjacent in the circumferential direction.

The airflow flown into the flow path 4 has the velocity component in the axially downward direction and the velocity component in the forward direction of the rotation direction of the impeller 2. The stationary blade 33 is inclined in the circumferential direction, and the velocity component in the circumferential direction is directed axially downward when the airflow passes between the adjacent stationary blades 33. That is, the airflow generated by the impeller 2 is rectified axially downward by passing between the stationary blades 33. The airflow having passed through the axially lower end of the stationary blade 33 is exhausted to the outside of the blower cover 3 through the exhaust port 41. In the blower A, the airflow directed from the upper side to the lower side in the axial direction is generated by the above-described operation.

The blower A includes the motor 1, the impeller 2, and the blower cover 3. With this configuration, the lower surface of the magnet holder 53 can be brought into contact with the lower spacer 55, and the magnet holder 53 can be positioned in the axial direction in the motor 1 mounted to the blower A. In addition, since the magnet holder 53 is configured to cover the radially outer side of the magnet 52, the fixing between the magnet 52 and the shaft 51 can be further strengthened.

Examples of a device using the blower A can include a vacuum cleaner. Hereinafter, a vacuum cleaner of an exemplary embodiment of the present disclosure will be described. FIG. 10 is a perspective view of the vacuum cleaner according to the embodiment. A vacuum cleaner CL is a so-called stick type electric vacuum cleaner, and has a housing 102 that opens an intake portion 103 and an exhaust portion 104 on a lower surface and an upper surface, respectively. A power cord (not illustrated) is led out from the back of the housing 102. The power cord is connected to a power socket (not illustrated) provided on a side wall surface or the like of a living room and supplies electric power to the vacuum cleaner CL. Incidentally, the vacuum cleaner CL may be a so-called robot type, canister type, or handy type electric vacuum cleaner.

In the housing 102, an air passage (not illustrated) connecting the intake portion 103 and the exhaust portion 104 is formed. In the air passage, a dust collecting portion (not illustrated), a filter (not illustrated), and the blower A are disposed from the upstream side to the downstream side in order. That is, the vacuum cleaner CL includes the blower A. As a result, the structure is simple, and the attachment strength of the magnet 52 to the shaft 51 can be improved in the blower A. Trash such as dust and dirt contained in air flowing through the air passage is shielded by the filter, and is collected in the dust collecting portion formed in a container shape. The dust collecting portion and the filter are configured to be detachable from the housing 102.

A grip portion 105 and an operation unit 106 are provided on the upper part of the housing 102. A user can grip the grip portion 105 to move the vacuum cleaner CL. The operation unit 106 has a plurality of buttons 106a, and performs operation setting of the vacuum cleaner CL by the operation of the button 106a. For example, a drive start, a drive stop, and a change of rotational speed of the blower A are instructed by the operation of the buttons 106a. A tubular suction pipe 107 is connected to the intake portion 103. A suction nozzle 108 is detachably attached to the suction pipe 107 at an upstream end (a lower end in the drawing) of the suction pipe 107.

In the vacuum cleaner CL, airflow is generated by driving of the blower A, whereby air is sucked from the suction nozzle 108. At this time, the trash such as dust and dirt on the floor surface F is sucked into the suction nozzle 108 together with air. The air sucked from the suction nozzle 108 flows through the suction pipe 107, the intake portion 103, the dust collecting portion, and the filter in order. The air having passed through the filter passes through the blower A. The airflow having passed through the blower A flows through the air passage inside the housing 102 of the vacuum cleaner CL, and is exhausted from the exhaust portion 104 (see FIG. 1) to the outside of the housing 102. As a result, the vacuum cleaner CL can clean the floor surface F.

When the vacuum cleaner CL is driven, air containing trash such as dust and dirt on the floor surface F flows through the suction nozzle 108, the suction pipe 107, the intake portion 103 (see FIG. 10 for all), the dust collecting portion, and the filter in order. The air having passed through the filter is sucked into the inside of the blower cover 3 from the intake port 311. Then, the air passes through the flow path 4 of the blower A and is exhausted to the outside of the blower cover 3 from the exhaust port 41. The airflow exhausted to the outside of the blower cover 3 flows through the air passage inside the housing 102 of the vacuum cleaner CL and is exhausted from the exhaust portion 104 (see FIG. 10) to the outside of the housing 102. As a result, the vacuum cleaner CL can clean the floor surface F.

The vacuum cleaner CL includes the blower A. With this configuration, the lower surface of the magnet holder 53 can be brought into contact with the lower spacer 55, and the magnet holder 53 can be positioned in the axial direction in the blower A mounted to the vacuum cleaner CL. In addition, since the magnet holder 53 is configured to cover the radially outer side of the magnet 52, the fixing between the magnet 52 and the shaft 51 can be further strengthened.

Figure 11:
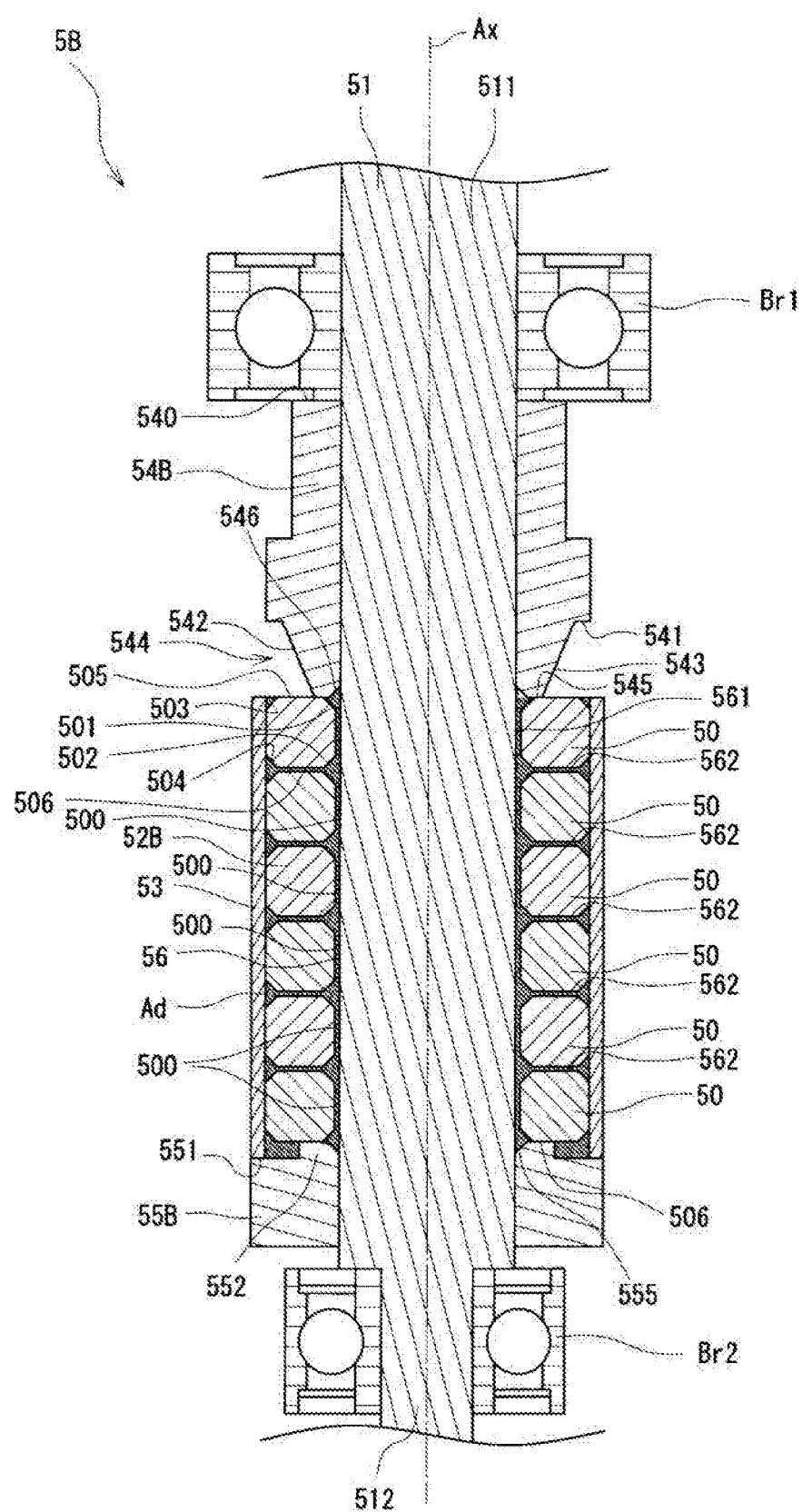
FIG. 11 is a longitudinal cross-sectional view illustrating another example of a rotor assembly according to an example embodiment of the present disclosure.
Figure 12:
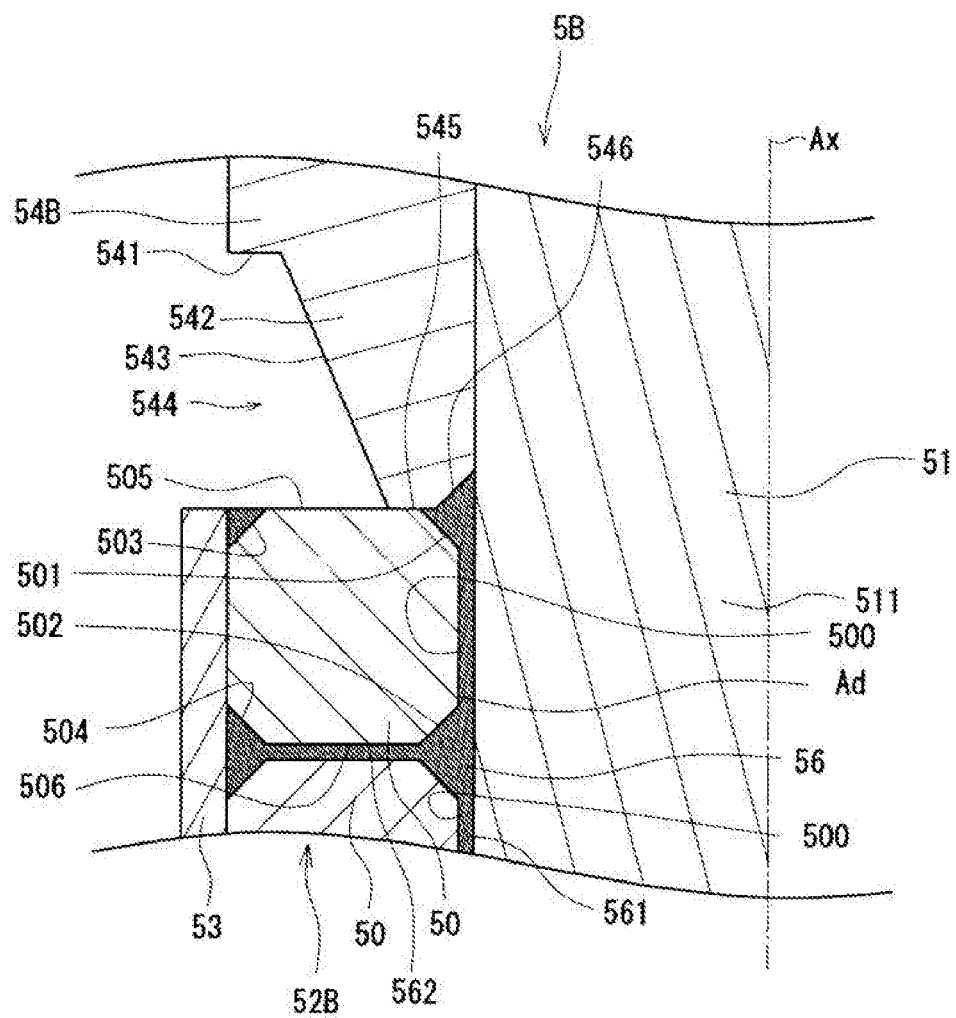
FIG. 12 is a longitudinal cross-sectional view illustrating a periphery of an axially upper end of the magnet of the rotor assembly illustrated in FIG. 11.
Figure 13:
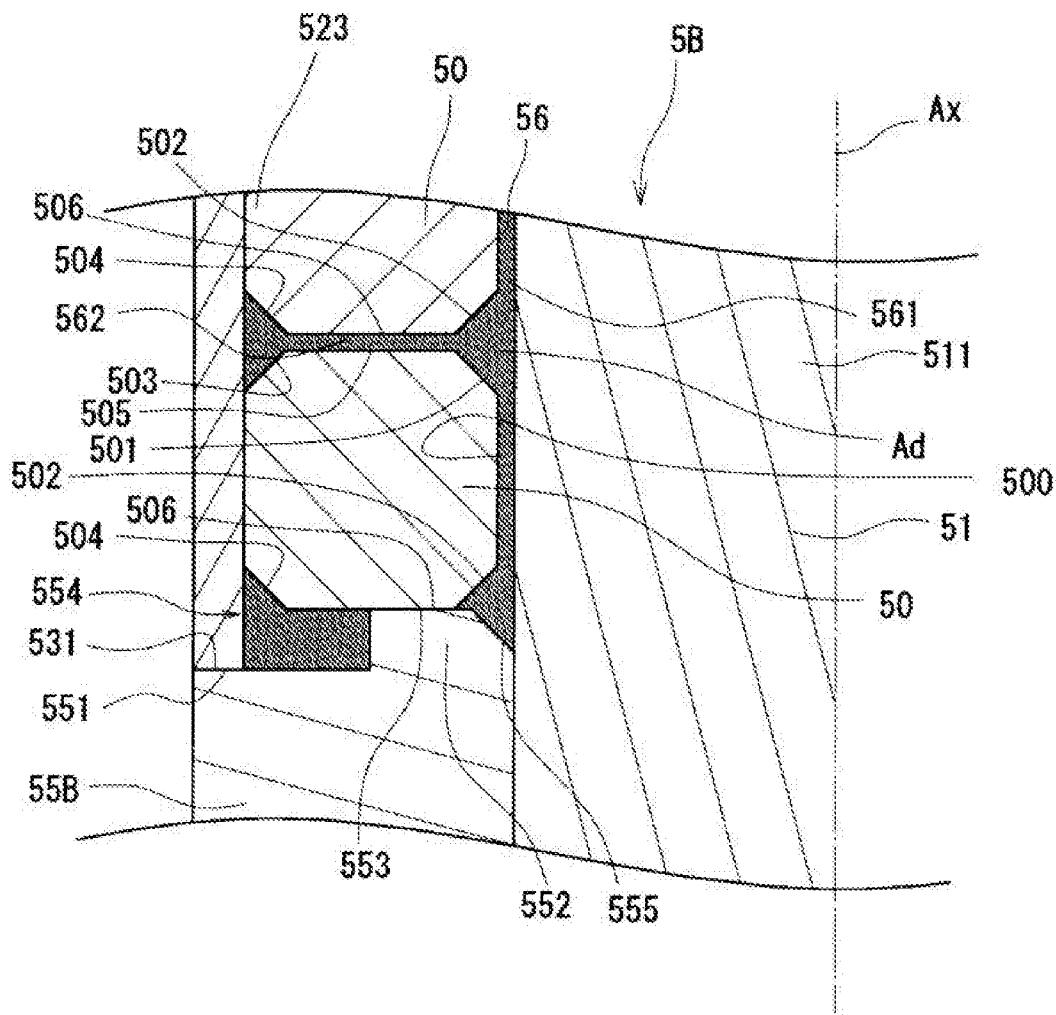
FIG. 13 is a longitudinal cross-sectional view illustrating a periphery of an axially lower end of the magnet of the rotor assembly illustrated in FIG. 11.

Another example of the rotor assembly according to the present disclosure will be described with reference to the drawings. FIG. 11 is a cross-sectional view of another example of the rotor assembly according to the present disclosure. FIG. 12 is a longitudinal cross-sectional view illustrating a periphery of an axially upper end of a magnet of the rotor assembly illustrated in FIG. 11. FIG. 13 is a longitudinal cross-sectional view illustrating a periphery of an axially lower end of the magnet of the rotor assembly illustrated in FIG. 11. The cross-sectional views of the rotor assembly illustrated in FIGS. 12 and 13 are longitudinal cross-sectional views illustrating one side in the radial direction from the central axis Ax, here, the left side, in a cross section cut along a plane including the central axis Ax.

A rotor assembly 5B of the embodiment is different from the rotor assembly 5 in terms of including a magnet 52B instead of the magnet 52, an upper spacer 54B and a lower spacer 55B, and additionally including an adhesive film 56. Thus, substantially the same parts as those of the rotor assembly 5 will be denoted by the same reference signs in the rotor assembly 5B, and detailed descriptions of the same parts will be omitted. In addition, an assembling process of the rotor assembly 5B of the embodiment is substantially the same as the assembling process of the rotor assembly 5. Thus, only the part different from the assembling process of the rotor assembly 5 will be described regarding the assembling process of the rotor assembly 5B. The rotor assembly 5B fixes the magnet 52B to the shaft 51 using the adhesive film 56 as illustrated in FIG. 11.

The magnet 52B includes six magnet pieces 50. The six magnet pieces 50 have annular shapes. The large-diameter portion 511 of the shaft 51 penetrates radial centers of the six magnet pieces 50, and the six magnet pieces 50 are arrayed in the axial direction. The magnet adhesive film 562 is provided between the magnet pieces 50 adjacent to each other in the axial direction. The magnet pieces 50 are fixed to each other by the magnet adhesive film 562.

An inner diameter of a radially inner surface 500 of the magnet piece 50 is larger than an outer diameter of the large-diameter portion 511 of the shaft 51. Further, a shaft adhesive film 561 is provided between the radially inner surface 500 of the magnet piece 50 and a radially outer surface of the large-diameter portion 511 of the shaft 51. The magnet piece 50 and the large-diameter portion 511 are fixed by the shaft adhesive film 561.

As illustrated in FIGS. 12 to 13, each of the magnet pieces 50 includes a magnet piece upper surface inner adhesive holding portion 501, a magnet piece lower surface inner adhesive holding portion 502, a magnet piece upper surface outer adhesive holding portion 503, and a magnet piece lower surface outer adhesive holding portion 504.

The magnet piece upper surface inner adhesive holding portion 501 is provided on a radially inner edge of an upper surface 505 of the magnet piece 50. Then, the magnet piece upper surface inner adhesive holding portion 501 is directed radially inward as proceeding axially downward.

The magnet piece lower surface inner adhesive holding portion 502 is provided on a radially inner edge of a lower surface 506 of the magnet piece 50. Then, the magnet piece lower surface inner adhesive holding portion 502 is directed radially inward as proceeding axially upward.

The magnet piece upper surface outer adhesive holding portion 503 is provided on a radially outer edge of the upper surface 505 of the magnet piece 50. Then, the magnet piece upper surface outer adhesive holding portion 503 is directed radially inward as proceeding axially upward.

The magnet piece lower surface outer adhesive holding portion 504 is provided on a radially outer edge of the lower surface 506 of the magnet piece 50. Then, the magnet piece lower surface outer adhesive holding portion 504 is directed radially inward as proceeding axially upward.

All the magnet piece upper surface inner adhesive holding portion 501, the magnet piece lower surface inner adhesive holding portion 502, the magnet piece upper surface outer adhesive holding portion 503, and the magnet piece lower surface outer adhesive holding portion 504 have an inclined surface having a linear cross-sectional shape, but the present invention is not limited thereto. For example, the holding portion may have a curved surface having a curved cross-sectional shape or a shape changing stepwise. It is possible to widely adopt a shape capable of collecting the adhesive Ad.

As illustrated in FIGS. 11 to 13, the magnet piece lower surface inner adhesive holding portion 502 of the magnet piece 50 on the axially upper side and the magnet piece upper surface inner adhesive holding portion 501 of the magnet piece 50 on the axially lower side among the magnet pieces 50 adjacent in the axial direction oppose each other in the axial direction. The adhesive Ad is collected between the magnet piece lower surface inner adhesive holding portion 502 and the magnet piece upper surface inner adhesive holding portion 501. The shaft adhesive film 561 and the magnet adhesive film 562 are the same adhesive Ad and are continuously formed. The adhesive Ad collected between the magnet piece lower surface inner adhesive holding portion 502 and the magnet piece upper surface inner adhesive holding portion 501 is continuously formed with both the shaft adhesive film 561 and the magnet adhesive film 562.

As a result, it is possible to enhance the magnetic efficiency of the rotor. In addition, the adhesion strength between the magnet pieces 50 and between the magnet piece 50 and the shaft 51 can be improved.

In addition, the continuous portion of the shaft adhesive film 561 and the magnet adhesive film 562 becomes large so that connection strength between the shaft adhesive film 561 and the magnet adhesive film 562 increases. As described above, the magnet piece 50 includes the magnet piece upper surface inner adhesive holding portion 501 and the magnet piece lower surface inner adhesive holding portion 502 so that the magnet pieces 50 and the magnet piece 50 and the shaft 51 can be firmly fixed. In addition, the volume filled with the adhesive Ad can be increased so that the adhesive Ad easily spreads between the magnet pieces 50. As a result, it is difficult for the adhesive Ad to hang.

As illustrated in FIGS. 11 to 13, the magnet piece lower surface outer adhesive holding portion 504 of the magnet piece 50 on the axially upper side and the magnet piece upper surface outer adhesive holding portion 503 of the magnet piece 50 on the axially lower side among the magnet pieces 50 adjacent in the axial direction oppose each other in the axial direction. A gap between the magnet piece lower surface outer adhesive holding portion 504 of the magnet piece 50 on the axially upper side and the magnet piece upper surface outer adhesive holding portion 503 of the magnet piece 50 on the axially lower side has the same configuration as the magnet groove 523 in the magnet 52 of the rotor assembly 5. That is, the adhesive Ad is collected in the gap between the magnet piece lower surface outer adhesive holding portion 504 and the magnet piece upper surface outer adhesive holding portion 503. As a result, the contact area between the magnet piece 50 and the adhesive film 56 becomes wide, and the adhesion strength between the magnet piece 50 and the magnet holder 53 can be improved.

The contact area between the upper surface 505 of the magnet piece 50 and the magnet adhesive film 562 is increased by providing the magnet piece upper surface inner adhesive holding portion 501 and the magnet piece upper surface outer adhesive holding portion 503. In addition, the contact area between the lower surface 506 of the magnet piece 50 and the magnet adhesive film 562 is increased by providing the magnet piece lower surface inner adhesive holding portion 502 and the magnet piece lower surface outer adhesive holding portion 504. As described above, the magnet piece 50 includes the magnet piece upper surface inner adhesive holding portion 501, the magnet piece lower surface inner adhesive holding portion 502, the magnet piece upper surface outer adhesive holding portion 503, and the magnet piece lower surface outer adhesive holding portion 504, and thus, the fixing strength between the magnet pieces 50 can be improved.

In addition, the magnet piece upper surface outer adhesive holding portion 503 of the magnet piece 50 disposed at the uppermost side in the axial direction has the same configuration as the magnet upper surface outer adhesive holding portion 521 of the magnet 52. Thus, the adhesive Ad is collected in the magnet piece upper surface outer adhesive holding portion 503 so that it is possible to prevent the adhesive Ad from leaking beyond the upper end of the magnet holder 53 to the outside in the radial direction. Further, the magnet piece lower surface outer adhesive holding portion 504 of the magnet piece 50 disposed at the lowest side in the axial direction has the same configuration as the magnet lower surface outer adhesive holding portion 522 of the magnet 52. Thus, the surface tension of the adhesive Ad and the magnet piece lower surface outer adhesive holding portion 504 becomes large so that the adhesive Ad becomes difficult to hang downward. As a result, it is possible to prevent the adhesive Ad from leaking from the gap between the magnet holder 53 and the lower spacer 55.

In addition, the contact area between the magnet 52B and the adhesive Ad is increased by providing the magnet piece upper surface outer adhesive holding portion 503 and the magnet piece lower surface outer adhesive holding portion 504, and thus, the fixing strength can be enhanced.

The upper spacer 54B includes an upper spacer adhesive holding portion 546 on a radially inner edge of the convex portion lower surface 545 of the upper spacer convex portion 542. The upper spacer adhesive holding portion 546 has an inclined surface directed radially inward as proceeding axially upward. Although the upper spacer adhesive holding portion 546 has the inclined surface having a linear cross-sectional shape, the present invention is not limited thereto. For example, the holding portion may have a curved surface having a curved cross-sectional shape or a shape changing stepwise.

The lower spacer 55B is disposed below lower ends of the plurality of magnet pieces 50 and fixed to the shaft 51. In addition, at least a part of an upper surface of the lower spacer 55B (the lower spacer convex portion 552) is in contact with the lower surface 506 of the magnet piece 50 disposed at an axially lowermost portion. As a result, the magnet pieces 50 (the magnets 52B) fixed side by side in the axial direction are positioned in the axial direction with respect to the shaft 51 by the lower spacer 55.

As a result, the radially outer edge of the lower spacer convex portion 552 in contact with the magnet piece 50 of the lower spacer 55B does not come into contact with the magnet piece 50. Thus, a magnetic flux from the lower surface of the magnet piece 50 hardly escapes to the lower spacer 55B side so that magnetic characteristics can be improved. In addition, the adhesive Ad, which fixes the magnet pieces 50 (the magnets 52B) fixed side by side in the axial direction and the magnet holder 53, is collected in the gap 554 between the lower spacer upper surface 551 and the lower surface 506 of the magnet piece 50 at the lowermost portion. In addition, the adhesive Ad can be collected in the gap 554 so that it is possible to prevent the adhesive Ad from leaking to the outside.

The lower spacer 55B includes a lower spacer adhesive holding portion 555 on a radially inner edge of the convex portion upper surface 553. The lower spacer adhesive holding portion 555 has an inclined surface directed radially inward as proceeding axially downward. Although the lower spacer adhesive holding portion 555 has the inclined surface having a linear cross-sectional shape, the present invention is not limited thereto. For example, the holding portion may have a curved surface having a curved cross-sectional shape or a shape changing stepwise. It is possible to widely adopt a shape capable of collecting the adhesive Ad. Since the adhesive Ad is collected in the lower spacer adhesive holding portion 555, it is possible to prevent the adhesive from leaking to the outside. In addition, even when the amount of the adhesive Ad supplied between the magnet pieces 50 varies, the excess adhesive Ad is contained in the lower spacer adhesive holding portion 555 since the adhesive Ad is collected in the lower spacer adhesive holding portion 555. As a result, variations in thickness of the magnet adhesive film 562 are suppressed, and an inclination of the magnet piece 50 is suppressed.

The assembling process of the rotor assembly 5B is different from the assembling process of the rotor assembly 5 illustrated in FIG. 9 in terms of the second step (STEP 2). In the assembling process of the rotor assembly 5B, the adhesive Ad is applied to the large-diameter portion 511 of the shaft 51, and then, the magnet pieces 50 are sequentially inserted in the second step (STEP 2). As a result, the adhesive Ad enters a gap between the radially inner surface 500 of the magnet piece 50 and the radially outer surface of the large-diameter portion 511. The adhesive Ad that has entered the gap between the radially inner surface 500 of the magnet piece 50 and the radially outer surface of the large-diameter portion 511 forms the shaft adhesive film 561. In addition, when the magnet piece 50 is moved in the axial direction, the adhesive Ad applied to the large-diameter portion 511 is pushed against the lower surface 506 of the magnet piece 50. The adhesive Ad flows between the axially adjacent magnet pieces 50. The adhesive Ad disposed between the magnet pieces 50 forms the magnet adhesive film 562. That is, both the shaft adhesive film 561 and the magnet adhesive film 562 are formed by the adhesive Ad applied to the shaft 51. Thus, the shaft adhesive film 561 and the magnet adhesive film 562 are connected.

In the assembling process of the rotor assembly 5B, positions of the lower spacer 55 and the magnet pieces 50 (the magnets 52B) aligned in the axial direction are temporarily set, and then, the magnet pieces 50 (the magnets 52B) aligned in the axial direction are moved in the axial direction before the adhesive Ad is cured to perform positional adjustment of the magnet pieces 50 (the magnets 52B) aligned in the axial direction in the second step (STEP 2) and the third step (STEP 3). Thus, it is possible to simply perform the positional adjustment in the axial direction of the magnet pieces 50 (the magnets 52B) fixed side by side in the axial direction.

In the rotor assembly 5B, the magnet 52B is axially divided into the plurality of magnet pieces 50. Thus, magnetic characteristics of the magnet 52B can be enhanced. As a result, it is possible to improve the rotation efficiency of the motor 1.

Other features are the same as the features of the first embodiment.

Figure 14:
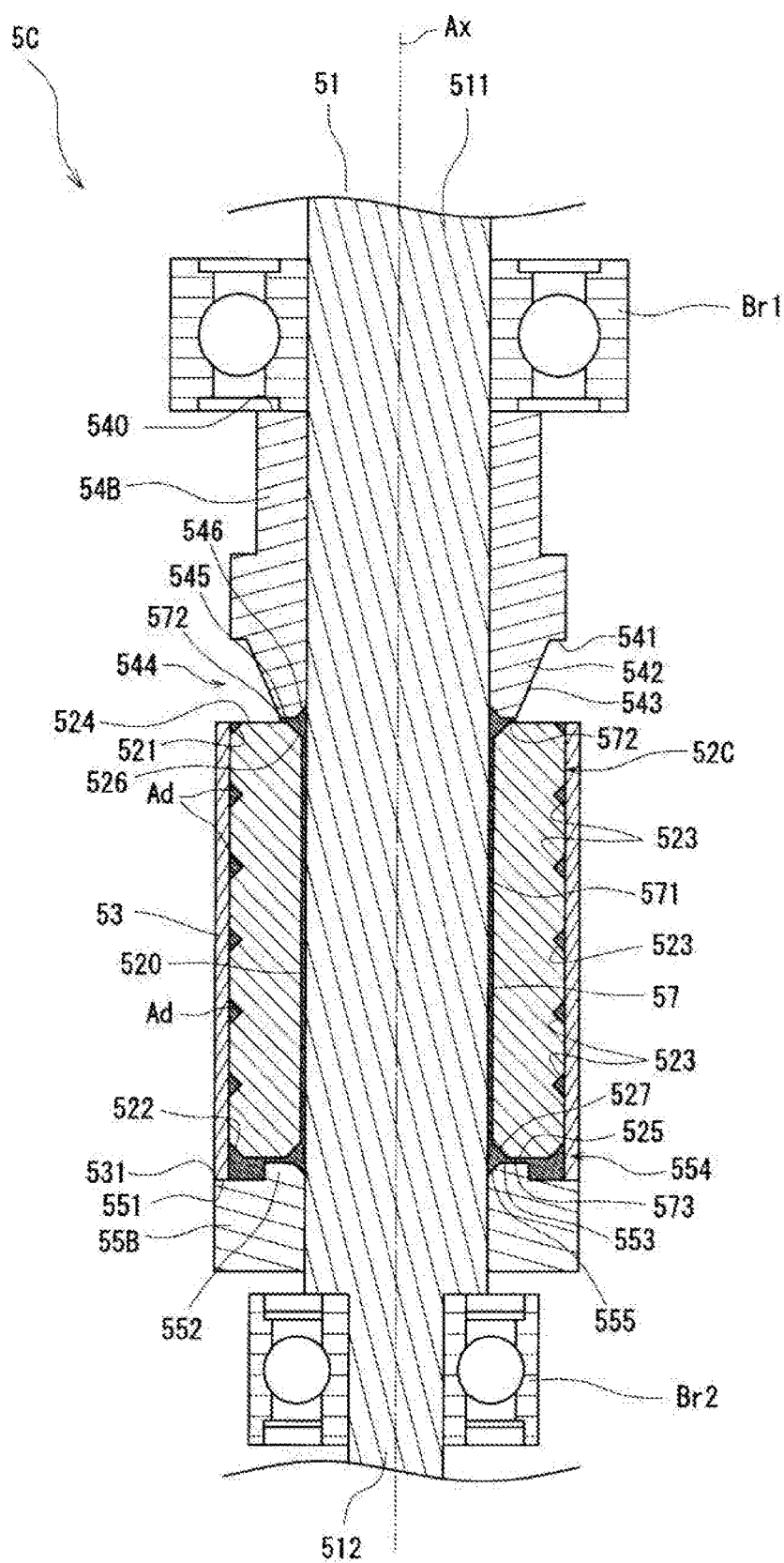
FIG. 14 is a longitudinal cross-sectional view illustrating another example of a rotor assembly according to an example embodiment of the present disclosure.
Figure 15:
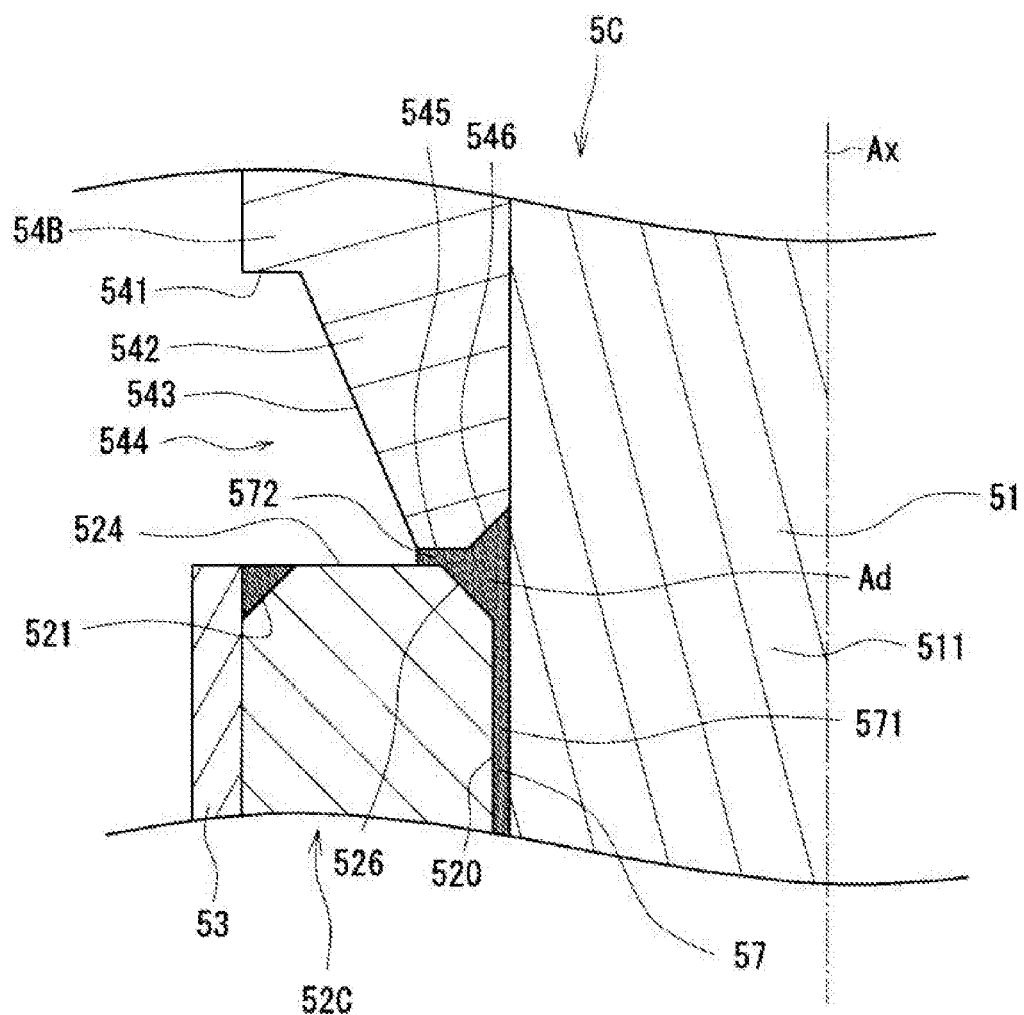
FIG. 15 is a longitudinal cross-sectional view illustrating a periphery of an axially upper end of a magnet of the rotor assembly illustrated in FIG. 14.
Figure 16:
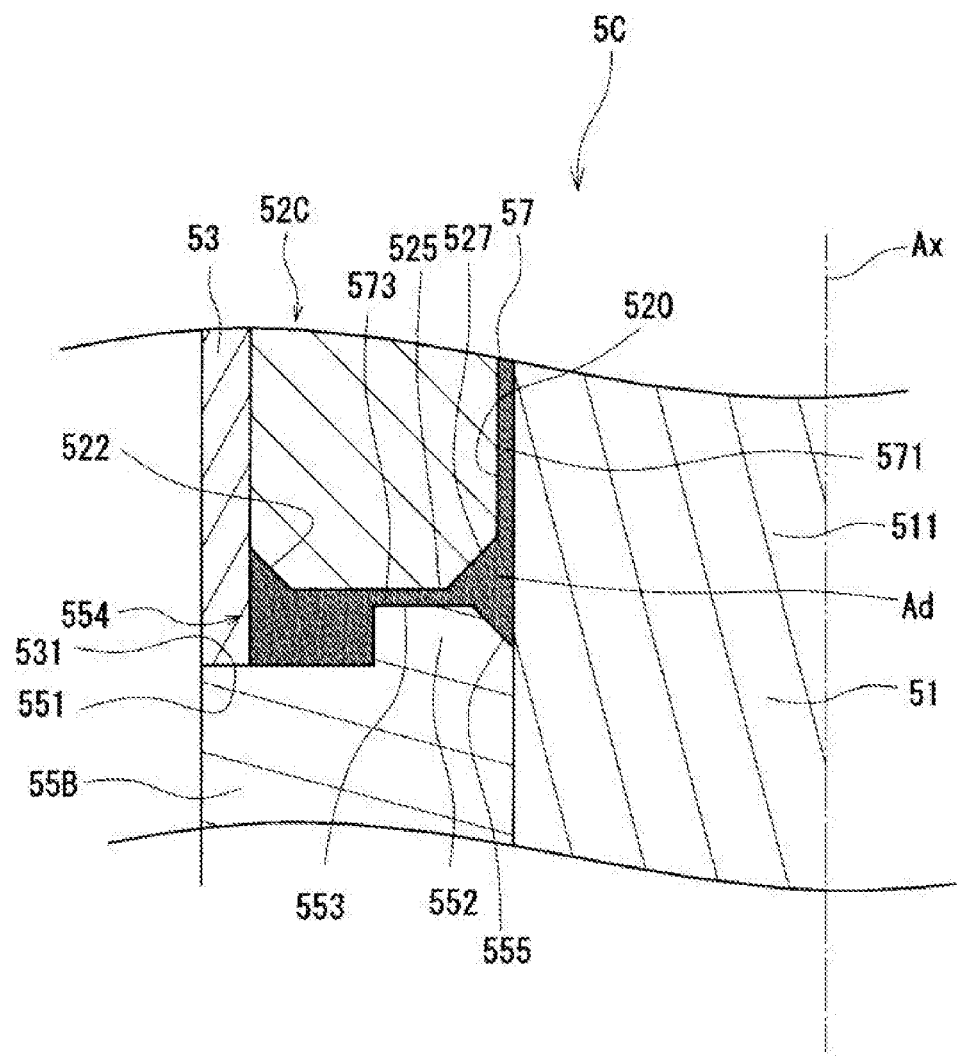
FIG. 16 is a longitudinal cross-sectional view illustrating a periphery of an axially lower end of the magnet of the rotor assembly illustrated in FIG. 14.

Another example of the rotor assembly according to the present disclosure will be described with reference to the drawings. FIG. 14 is a cross-sectional view of another example of the rotor assembly according to the present disclosure. FIG. 15 is a cross-sectional view illustrating an axially upper end of a magnet of the rotor assembly illustrated in FIG. 14. FIG. 16 is a longitudinal cross-sectional view illustrating a periphery of an axially lower end of the magnet of the rotor assembly illustrated in FIG. 14. The cross-sectional views of the rotor assembly 15 and 16 are cross-sectional views illustrating one side in the radial direction from of the central axis Ax, here, the left side, in a cross section cut along a plane including the central axis Ax.

A rotor assembly 5C of the embodiment is different from the rotor assembly 5 in terms of including a magnet 52C instead of the magnet 52, the upper spacer 54B and the lower spacer 55B, and additionally including an adhesive film 57. Thus, substantially the same parts as those of the rotor assembly 5 will be denoted by the same reference signs in the rotor assembly 5C, and detailed descriptions of the same parts will be omitted. Incidentally, the upper spacer 54B and the lower spacer 55B have the same configurations as those of the rotor assembly 5B and will be denoted by the same reference signs, and detailed descriptions thereof will be omitted. In addition, an assembling process of the rotor assembly 5C of the embodiment is substantially the same as the assembling process of the rotor assembly 5. Thus, only the part different from the assembling process of the rotor assembly 5 will be described regarding the assembling process of the rotor assembly 5C.

In the magnet 52C, an inner diameter of the radially inner surface 520 is larger than the outer diameter of a radially outer surface of the large-diameter portion 511 of the shaft 51. That is, the magnet 52C has a tubular shape and is disposed on a radially outer side of the shaft 51. Further, a shaft adhesive film 571 is provided in a gap between the radially inner surface 520 of the magnet 52C and the radially outer surface of the large-diameter portion 511 of the shaft 51. That is, the shaft adhesive film 571 is disposed between the radially outer surface of the shaft 51 and the radially inner surface 520 of the magnet 52C and attaches the shaft 51 to the magnet 52C.

An upper spacer adhesive film 572 is provided in a gap between the convex portion lower surface 545 of the upper spacer convex portion 542 and the magnet upper surface 524. In addition, a lower spacer adhesive film 573 is provided in a gap between the convex portion upper surface 553 of the lower spacer convex portion 552 and the magnet lower surface 525.

That is, the lower spacer 55B is disposed axially below the magnet 52C and is fixed to the radially outer surface of the shaft 51. The lower spacer 55B includes a lower spacer convex portion 552 protruding toward the magnet 52C on a radially inner side of a radially outer edge of the axially upper surface 551.

That is, the lower spacer adhesive film 573 is disposed between the axially upper surface 553 of the lower spacer 55B and the axially lower surface 525 of the magnet 52C and attaches the lower spacer 55B to the magnet 52C. More specifically, the lower spacer adhesive film 573 is disposed in a gap between the convex portion upper surface 553 of the lower spacer 55B and the magnet lower surface 525. As a result, the radially outer edge of the upper end in contact with the magnet 52C of the lower spacer 55B does not come into contact with the magnet 52C, and thus, the excess adhesive Ad caused by variations in the coating amount can be released to the gap between the lower spacer 55B and the magnet 52C. In addition, the radially outer edge of the convex portion upper surface 553 in contact with the magnet 52C of the lower spacer 55B does not come into contact with the magnet 52C. Thus, a magnetic flux from the lower surface 525 of the magnet 52C hardly escapes to the lower spacer 55B side so that magnetic characteristics can be improved. That is, the magnetic flux can be prevented from flowing from the axially upper end of the magnet 52C to the lower spacer 55B by providing the gap 554.

In addition, the lower spacer 55B includes the lower spacer adhesive holding portion 555 on which at least a part of the adhesive Ad is disposed and which is directed axially downward as proceeding radially inward, on the radially inner edge of the axially upper end. As a result, the lower spacer adhesive holding portion 555 can widely adopt a shape capable of collecting the adhesive Ad. Since the adhesive Ad is collected in the lower spacer adhesive holding portion 555, it is possible to prevent the adhesive from leaking to the outside.

The magnet 52C has a magnet upper surface inner adhesive holding portion 526 and a magnet lower surface inner adhesive holding portion 527. The magnet upper surface inner adhesive holding portion 526 is provided on a radially inner edge of the upper surface 524 of the magnet 52C. The magnet lower surface inner adhesive holding portion 527 is provided on a radially inner edge of the lower surface 525 of the magnet 52C.

The magnet upper surface inner adhesive holding portion 526 is directed radially inward as proceeding axially downward. Although the magnet upper surface inner adhesive holding portion 526 has an inclined surface having a linear cross-sectional shape, the present invention is not limited thereto. For example, the holding portion may have a curved inclined surface having a curved cross-sectional shape or a shape changing stepwise.

It is possible to collect the adhesive Ad between the convex portion lower surface 545 and the magnet upper surface 524 by forming the magnet upper surface inner adhesive holding portion 526 and the upper spacer adhesive holding portion 546. Accordingly, it is possible to prevent the adhesive Ad disposed in a gap among the shaft 51 and the magnet 52C and the upper spacer 54B from leaking to the radially outer side of the upper spacer convex portion 542. In addition, the contact area among the adhesive Ad, the shaft 51, the magnet 52C, and the upper spacer 54B can be increased, the shaft 51, the magnet 52C, and the upper spacer 54B can be firmly fixed. The shaft adhesive film 571 and the upper spacer adhesive film 572 are integrated adhesive films. That is, the shaft adhesive film 571 and the upper spacer adhesive film 572 are continuous and integrated adhesive films formed of the same adhesive Ad.

The magnet lower surface inner adhesive holding portion 527 is directed radially inward as proceeding axially upward. That is, the magnet 52C includes the inner adhesive holding portion (the magnet upper surface inner adhesive holding portion 526 or the magnet lower surface inner adhesive holding portion 527) on which at least a part of the adhesive Ad is disposed, on at least one side of the radially inner edge of the axially upper end 524 or the radially inner edge of the axially lower end 525. In other words, the magnet 52C includes inner adhesive holding portions 526 and 527 on which at least a part of the adhesive Ad is disposed, on at least one side of the radially inner edge located at the axially upper end 524 or the axially lower end 525.

Although the magnet lower surface inner adhesive holding portion 527 has an inclined surface having a linear cross-sectional shape, the present invention is not limited thereto. For example, the holding portion may have a curved inclined surface having a curved cross-sectional shape or a shape changing stepwise.

It is possible to collect the adhesive Ad between the convex portion upper surface 553 and the magnet lower surface 525 by forming the magnet lower surface inner adhesive holding portion 527 and the lower spacer adhesive holding portion 555. Accordingly, it is possible to prevent the adhesive Ad disposed in a gap among the shaft 51 and the magnet 52C and the lower spacer 55B from leaking to the radially outer side of the lower spacer convex portion 552. In addition, the contact area among the adhesive Ad, the shaft 51, the magnet 52C, and the lower spacer 55B can be increased, the shaft 51, the magnet 52C, and the lower spacer 55B can be firmly fixed.

The shaft adhesive film 571 and the lower spacer adhesive film 573 are integrated adhesive films. That is, the shaft adhesive film 571 and the lower spacer adhesive film 573 are continuous and integrated adhesive films formed of the same adhesive Ad. That is, the shaft adhesive film 571 and the lower spacer adhesive film 573 are the same adhesive and are continuously formed. That is, the shaft adhesive film 571 and the lower spacer adhesive film 573 are not separately formed, but the both are integrally formed as a single continuous adhesive film. Accordingly, the shaft 51, the magnet 52C, and the lower spacer 55B are fixed by the integrated single continuous adhesive film. As a result, the shaft 51, the magnet 52C, and the lower spacer 55B can be more firmly fixed.

In addition, the motor 1 includes the rotor assembly 5C, the stator 12, and the motor housing 11. As a result, the shaft 51, the magnet 52C, and the lower spacer 55B can be more firmly fixed in the rotor assembly 5 of the motor 1. Further, the blower A includes the motor 1, the impeller 2, and the blower cover 3. As a result, the shaft 51, the magnet 52C, and the lower spacer 55B can be more firmly fixed in the rotor assembly 5C of the motor 1 in the blower A. In addition, the shaft 51, the magnet 52C, and the lower spacer 55B can be more firmly fixed in the rotor assembly 5C of the motor 1 in the blower A.

At least a part of the axially lower surface 531 of the magnet holder 53 is in contact with the axially upper surface 551 of the lower spacer 55B. As a result, the magnet holder 53 is positioned in the axial direction with respect to the shaft 51 by the lower spacer 55B.

The axially lower surface 531 is in contact with the lower spacer upper surface 551 over the entire circumference in the circumferential direction. That is, the axially lower surface 531 of the magnet holder 53 is in contact with the axially upper surface 551 of the lower spacer 55B over the entire region in the circumferential direction. As a result, it is possible to prevent the magnet holder 53 from being inclined with respect to the central axis Ax. In addition, the magnet 52C held by the magnet holder 53 on the radially outer surface is also prevented from being inclined with respect to the central axis Ax.

In addition, the axially lower surface 531 is in contact with the lower spacer upper surface 551 over the entire circumference in the circumferential direction. Thus, the adhesive Ad hardly leaks radially outward from the gap between the lower spacer upper surface 551 and the axially lower surface 531. That is, it is possible to prevent the adhesive Ad collected in the gap between the magnet lower surface 525 and the lower spacer upper surface 551 from leaking from the space between the magnet holder 53 and the lower spacer 55B.

In assembling of the rotor assembly 5C, the adhesive Ad to the shaft 51 in the second step (STEP 2) in the assembling process of the rotor assembly 5 illustrated in FIG. 9. In the second step (STEP 2), the magnet 52C is attached to the shaft 51 to be moved axially downward so that a part of the adhesive Ad that has been applied to the shaft 51 enters the gap between the radially inner surface 520 of the magnet 52C and the large-diameter portion 511 of the shaft 51. Then, the remaining adhesive Ad is pushed axially downward by the magnet lower surface 525 of the magnet 52C. When the magnet 52C is further moved in the axial direction, a part of the adhesive Ad that has entered the gap between the radially inner surface 520 and the large-diameter portion 511 of the magnet 52C is exposed to the outside from above the magnet upper surface 524 of the magnet 52C.

In addition, a part of the adhesive Ad pushed by the magnet lower surface 525 of the magnet 52C is disposed in a gap between the magnet lower surface 525 and the convex portion upper surface 553 of the lower spacer convex portion 552. This adhesive Ad forms the lower spacer adhesive film 573. In the third step (STEP 3), the upper spacer 54B is mounted from the upper end of the shaft 51 and moved with respect to the magnet 52C disposed at a set position. At this time, the upper spacer 54B is press-fitted into the large-diameter portion 511, and thus, the convex portion lower surface 545 of the upper spacer 54B pushes the adhesive Ad remaining on the outer surface of the large-diameter portion 511 axially downward. At this time, a part of the adhesive Ad is collected in the upper spacer adhesive holding portion 546. As a result, when the upper spacer 54 moves in the axial direction, the adhesive Ad hardly leaks from a radially outer edge of the convex portion lower surface 545. As a result, it is possible to suppress unevenness of the adhesive Ad flowing through the gap between the convex portion lower surface 545 and the magnet upper surface 524. The lower spacer 55 is directly fixed to the shaft 51, and the adhesive Ad pushed downward by the magnet 52C spreads along the lower spacer upper surface 551 to form the lower spacer adhesive film 573 when the magnet 52C is pushed into the shaft 51. Thus, the step of applying the adhesive can be omitted, and the number of steps can be reduced.

Since the rotor assembly 5C is provided with the upper spacer adhesive film 572, the magnet 52C and the upper spacer 54B can be firmly fixed by the adhesive Ad. In addition, the upper spacer 54B can collect the adhesive Ad in the upper spacer adhesive holding portion 546 at the time of assembling. Since the adhesive Ad is collected in the upper spacer adhesive holding portion 546, it is possible to suppress unevenness in the amount of the adhesive Ad flowing between the convex portion lower surface 545 and the magnet upper surface 524. As a result, the upper spacer 54B and the magnet 52C can be firmly fixed. In addition, it is possible to suppress variations in thickness of the upper spacer adhesive film 572 to be formed of the adhesive Ad and to suppress the inclination of the magnet 52C.

In addition, the upper spacer 54B is further pushed axially downward in the fourth step (STEP 4) so that a part of the adhesive Ad that has been applied to the radially outer surface of the shaft 51 protrudes above the magnet upper surface 524 in some cases. The protruding adhesive Ad is contained between the convex portion lower surface 545 and the magnet upper surface 524. As a result, the upper spacer adhesive film 572 is formed, and thus, the fixation between the upper spacer 54B and the magnet 52C becomes firmer. Incidentally, when the magnet upper surface inner adhesive holding portion 526 is formed in the magnet 52C or when the upper spacer adhesive holding portion 546 is formed in the upper spacer 54B, the adhesive Ad is easily contained between the convex portion lower surface 545 and the magnet upper surface 524 so that the upper spacer 54B and the magnet 52C are more firmly fixed.

Since the rotor assembly 5C is provided with the lower spacer adhesive film 573, the magnet 52C and the lower spacer 55B can be firmly fixed by the adhesive Ad. In addition, the lower spacer 55B can collect the adhesive Ad in the lower spacer adhesive holding portion 555 at the time of assembling. Since the adhesive Ad is collected in the lower spacer adhesive holding portion 555, it is possible to suppress unevenness of the adhesive Ad flowing between the convex portion upper surface 553 and the magnet lower surface 525. As a result, the lower spacer 55B and the magnet 52C can be firmly fixed. In addition, it is possible to suppress variations in thickness of the lower spacer adhesive film 573 to be formed of the adhesive Ad and to suppress the inclination of the magnet 52C.

Further, the shaft adhesive film 571, the upper spacer adhesive film 572, and the lower spacer adhesive film 573 are the same adhesive and are connected. With such a configuration, the strength of the adhesive film 57 can be enhanced, and the fixing strength of the magnet 52C to the shaft 51 can be improved.

The rotor assembly of the present disclosure can be used as, for example, a rotor of an inner rotor type brushless motor. In addition, the motor using the rotor assembly of the present disclosure can be used for a blower and a vacuum cleaner including the blower.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor assembly comprising:
   a shaft disposed along a central axis extending vertically;
   a tubular magnet disposed on a radially outer surface of the shaft;
   a lower spacer disposed axially below the magnet and fixed to the radially outer surface of the shaft;
   a shaft adhesive film disposed between the radially outer surface of the shaft and a radially inner surface of the magnet to attach the shaft to the magnet; and
   a lower spacer adhesive film disposed between an axially upper surface of the lower spacer and an axially lower surface of the magnet to attach the lower spacer to the magnet; wherein
   the shaft adhesive film and the lower spacer adhesive film are an identical adhesive and are continuously formed; and
   the lower spacer includes a lower spacer adhesive holding portion on which at least a portion of the adhesive is disposed and which extends axially downward and radially inward, on a radially inner edge of an axially upper end.

2. The rotor assembly according to claim 1, wherein the magnet includes an inner adhesive holding portion on which at least a portion of the adhesive is disposed on at least one side of a radially inner edge of an axially upper end and a radially inner edge of an axially lower end.

3. The rotor assembly according to claim 1, wherein
   the lower spacer includes a lower spacer convex portion that protrudes toward the magnet on a radially inner side of a radially outer edge of an axially upper surface; and
   the lower spacer adhesive film is disposed between an upper surface of the lower spacer convex portion and a lower surface of the magnet.

4. The rotor assembly according to claim 1, further comprising a tubular magnet holder disposed on a radially outer side of the magnet; wherein
   at least a portion of an axially lower surface of the magnet holder is in contact with the axially upper surface of the lower spacer.

5. The rotor assembly according to claim 4, wherein the axially lower surface of the magnet holder is in contact with the axially upper surface of the lower spacer over an entire region in a circumferential direction.

6. A motor comprising:
   the rotor assembly according to claim 1;
   a stator radially opposing a radially outer surface of the rotor assembly; and
   a motor housing rotatably supporting the rotor assembly and holding the stator.

7. A blower comprising:
the motor according to claim 6;
an impeller fixed to the shaft; and
a tubular blower cover opposing the motor and a radially outer surface of the impeller.

8. A vacuum cleaner comprising the blower according to claim 7.

9. A rotor assembly comprising:
a shaft disposed along a central axis extending vertically;
a tubular magnet disposed on a radially outer surface of the shaft;
a lower spacer disposed axially below the magnet and fixed to the radially outer surface of the shaft;
a shaft adhesive film disposed between the radially outer surface of the shaft and a radially inner surface of the magnet to attach the shaft to the magnet; and
a lower spacer adhesive film disposed between an axially upper surface of the lower spacer and an axially lower surface of the magnet to attach the lower spacer to the magnet; wherein
the shaft adhesive film and the lower spacer adhesive film are an identical adhesive and are continuously formed;
the lower spacer includes a lower spacer convex portion that protrudes toward the magnet on a radially inner side of a radially outer edge of an axially upper surface; and
the lower spacer adhesive film is disposed between an upper surface of the lower spacer convex portion and a lower surface of the magnet.

10. The rotor assembly according to claim 9, wherein the magnet includes an inner adhesive holding portion on which at least a portion of the adhesive is disposed on at least one side of a radially inner edge of an axially upper end and a radially inner edge of an axially lower end.

11. The rotor assembly according to claim 9, further comprising a tubular magnet holder disposed on a radially outer side of the magnet; wherein
at least a portion of an axially lower surface of the magnet holder is in contact with the axially upper surface of the lower spacer.

12. The rotor assembly according to claim 11, wherein the axially lower surface of the magnet holder is in contact with the axially upper surface of the lower spacer over an entire region in a circumferential direction.

13. A motor comprising:
the rotor assembly according to claim 9;
a stator radially opposing a radially outer surface of the rotor assembly; and
a motor housing rotatably supporting the rotor assembly and holding the stator.

14. A blower comprising:
the motor according to claim 13;
an impeller fixed to the shaft; and
a tubular blower cover opposing the motor and a radially outer surface of the impeller.

15. A vacuum cleaner comprising the blower according to claim 14.

* * * * *